(12) United States Patent
Arai et al.

(10) Patent No.: US 11,617,701 B2
(45) Date of Patent: Apr. 4, 2023

(54) ASSIST DEVICE

(71) Applicant: JTEKT CORPORATION, Osaka (JP)

(72) Inventors: Tomoki Arai, Kitakatsuragi-gun (JP); Yoshiyuki Shibata, Toyota (JP)

(73) Assignee: JTEKT CORPORATION, Kariya (JP)

( * ) Notice: Subject to any disclaimer, the term of this patent is extended or adjusted under 35 U.S.C. 154(b) by 63 days.

(21) Appl. No.: 16/748,861

(22) Filed: Jan. 22, 2020

(65) Prior Publication Data

US 2020/0237600 A1 Jul. 30, 2020

(30) Foreign Application Priority Data

Jan. 24, 2019 (JP) .............................. JP2019-010207

(51) Int. Cl.
*A61H 3/00* (2006.01)
*A61H 1/02* (2006.01)

(52) U.S. Cl.
CPC ............ *A61H 3/00* (2013.01); *A61H 1/0244* (2013.01); *A61H 2003/007* (2013.01); *A61H 2201/1207* (2013.01); *A61H 2201/1642* (2013.01); *A61H 2201/5043* (2013.01); *A61H 2201/5061* (2013.01)

(58) Field of Classification Search
CPC .. A61H 3/00; A61H 1/0244; A61H 2203/007; A61H 2201/1207; A61H 2201/1642; A61H 2201/5043; A61H 2201/5061
See application file for complete search history.

(56) References Cited

U.S. PATENT DOCUMENTS

| | | | | |
|---|---|---|---|---|
| 7,402,142 B2 * | 7/2008 | Kawai | ................. | B62D 57/032 600/595 |
| 2010/0094188 A1 * | 4/2010 | Goffer | ................. | A61H 1/0266 602/23 |
| 2013/0006159 A1 * | 1/2013 | Nakashima | .............. | A61H 3/00 602/23 |
| 2014/0142475 A1 * | 5/2014 | Goldfarb | ................. | A61H 3/00 601/35 |

(Continued)

FOREIGN PATENT DOCUMENTS

| | | |
|---|---|---|
| JP | 2012-183291 A | 9/2012 |
| JP | 2013-173190 A | 9/2013 |

(Continued)

OTHER PUBLICATIONS

Office Action dated Oct. 4, 2022 in Japanese Patent Application No. 2019-010207, along with a partial English translation.

*Primary Examiner* — Jerrah Edwards
*Assistant Examiner* — Aren Patel
(74) *Attorney, Agent, or Firm* — Oblon, McClelland, Maier & Neustadt, L.L.P.

(57) ABSTRACT

An assist device includes a body mounting fixture, an actuator, an operation state detector, and a controller. The controller is configured to control drive of the actuator. The controller is configured to acquire an estimated posture of the wearer, which is estimated based on operation detection information detected by the operation state detector, when the actuator generates the assist torque. The controller is configured to determine whether or not the estimated posture is an unreasonable posture in which an excessive force is applied to a lower back portion.

19 Claims, 9 Drawing Sheets

(56) References Cited

U.S. PATENT DOCUMENTS

| | | | | |
|---|---|---|---|---|
| 2016/0074272 | A1* | 3/2016 | Ahn | A61B 5/1123 |
| | | | | 623/24 |
| 2017/0151070 | A1* | 6/2017 | Sun | H04W 4/029 |
| 2018/0056104 | A1* | 3/2018 | Cromie | A63B 21/4039 |
| 2018/0177672 | A1* | 6/2018 | Uchida | A63B 21/4011 |
| 2018/0257216 | A1* | 9/2018 | Shavit | B25J 9/0006 |
| 2018/0272525 | A1* | 9/2018 | Kumeno | B25J 9/1638 |
| 2019/0066327 | A1* | 2/2019 | Fujimoto | G06T 7/60 |
| 2019/0133866 | A1* | 5/2019 | Tsai | G05B 1/01 |

FOREIGN PATENT DOCUMENTS

| | | |
|---|---|---|
| JP | 2018-030021 A | 3/2018 |
| JP | 2018-069414 A | 5/2018 |

* cited by examiner

ASSIST DEVICE

INCORPORATION BY REFERENCE

The disclosure of Japanese Patent Application No. 2019-010207 filed on Jan. 24, 2019 including the specification, drawings and abstract is incorporated herein by reference in its entirety.

BACKGROUND

1. Technical Field

The present disclosure relates to an assist device that assists a wearer in performing operation.

2. Description of Related Art

There are proposed a variety of assist devices that assist a person in working as mounted on the body of the person. For example, Japanese Unexamined Patent Application Publication No. 2013-173190 (JP 2013-173190 A) describes a mounting-type operation assisting device that includes a lower back frame mounted to the lower back of a wearer, a back support portion, an abdomen support portion, a coupling member that couples the back support portion and the abdomen support portion to each other, a thigh fixed portion fixed to a thigh portion, and a drive mechanism that drives the thigh fixed portion with respect to the lower back frame. The mounting-type operation assisting device further includes a biological signal detection sensor affixed to the skin of the wearer and a control portion that controls the drive mechanism based on a biological signal output from the biological signal detection sensor.

In the case where the wearer uses the muscle power of the two legs and maintains the posture below the lower back, the right and left hip joint angles that are detected by angle sensors built in right and left drive motors that constitute the drive mechanism are substantially equal to each other. The right and left drive motors transfer drive torque to the back support portion and the abdomen support portion of the lower back frame with second coupling portions which are fastened to the right and left thighs of the wearer, serving as the fixed side, and with right and left first coupling portions which are fixed to the lower back frame, serving as the movable side. Consequently, the lower back, the back, and the abdomen of the wearer are held by drive torque of the drive motors, which reduces a burden on the lower back when the wearer works to lift up a heavy object placed on the floor surface.

SUMMARY

With the mounting-type operation assisting device described in JP 2013-173190 A, a burden on the lower back is reduced when the wearer works to lift up a heavy object placed on the floor surface etc. However, an excessive force may be applied to the lower back portion (and the right and left hip joint angles are unequal to each other) to cause lumbago if the wearer works to lift up a heavy object in an unreasonable posture.

The present disclosure provides an assist device that can effectively suppress lumbago by making it less likely that an excessive force is applied to the lower back portion of a wearer by suppressing the wearer working to lift up a heavy object in an unreasonable posture.

An aspect of the present disclosure provides an assist device that includes a body mounting fixture, an actuator, an operation state detector, and a controller. The body mounting fixture is to be mounted to at least a lower back portion of a wearer. The actuator is mounted to the body mounting fixture and a thigh portion of the wearer. The actuator is configured to generate assist torque for assisting operation of the thigh portion with respect to the lower back portion of the wearer or operation of the lower back portion with respect to the thigh portion of the wearer. The operation state detector is configured to detect an operation state of the wearer. The controller is configured to control drive of the actuator. The controller is configured to acquire an estimated posture of the wearer estimated based on operation detection information detected by the operation state detector when the actuator generates the assist torque. The controller is configured to determine whether or not the estimated posture is an unreasonable posture in which an excessive force is applied to the lower back portion.

With the assist device according to the aspect of the present disclosure, the controller estimates the posture of the wearer based on the operation detection information that is detected by the operation state detector when the actuator generates the assist torque for assisting operation of the thigh portion with respect to the lower back portion of the wearer or operation of the lower back portion with respect to the thigh portion of the wearer. The controller determines whether or not the estimated posture of the wearer is an unreasonable posture in which an excessive force is applied to the lower back portion.

Consequently, the controller can warn the wearer that the posture of the wearer may be a posture in which an excessive force is applied to the lower back portion when the actuator generates the assist torque when it is determined that the estimated posture of the wearer is an unreasonable posture in which an excessive force is applied to the lower back portion. Thus, it is possible to effectively suppress lumbago by avoiding that an excessive force is applied to the lower back portion by suppressing the wearer working to lift up a heavy object in an unreasonable posture.

In the assist device according to the aspect of the present disclosure, the controller may be configured to determine based on the operation detection information whether or not the estimated posture transitions to the unreasonable posture in which an excessive force is applied to the lower back portion when it is determined that the estimated posture is not the unreasonable posture in which the excessive force is applied to the lower back portion.

With the assist device according to the aspect of the present disclosure, the controller determines, based on the operation detection information that is detected by the operation state detector, whether or not the estimated posture of the wearer transitions to an unreasonable posture in which an excessive force is applied to the lower back portion when the controller determines that the estimated posture of the wearer is not an unreasonable posture in which an excessive force is applied to the lower back portion. Consequently, the controller can warn the wearer that the estimated posture of the wearer transitions to an unreasonable posture in which an excessive force is applied to the lower back portion in the case where the controller determines that the estimated posture of the wearer transitions to an unreasonable posture in which an excessive force is applied to the lower back portion. Thus, it is possible to effectively suppress lumbago by avoiding that an excessive force is applied to the lower back portion by suppressing the wearer working to lift up a heavy object in an unreasonable posture.

The assist device according to the aspect of the present disclosure may further include an informing device configured to inform the wearer. The controller may be configured to control the informing device so as to inform the wearer that the estimated posture is the unreasonable posture in which the excessive force is applied to the lower back portion when it is determined that the estimated posture is the unreasonable posture in which the excessive force is applied to the lower back portion.

With the assist device according to the aspect of the present disclosure, the controller informs the wearer using the informing device that the estimated posture of the wearer is an unreasonable posture in which an excessive force is applied to the lower back portion in the case where it is determined that the estimated posture of the wearer is an unreasonable posture in which an excessive force is applied to the lower back portion. Consequently, the wearer can easily recognize that he/she is lifting up a heavy object in an unreasonable posture in which an excessive force is applied to the lower back portion, which can further effectively suppress lumbago by avoiding that an excessive force is applied to the lower back portion.

The assist device according to the aspect of the present disclosure may further include an informing device configured to inform the wearer. The controller may be configured to determine correction operation for correcting the estimated posture such that the wearer is allowed to take a safe posture in which the excessive force is not applied to the lower back portion. The controller may be configured to control the informing device so as to inform the wearer that the wearer transitions to the unreasonable posture in which the excessive force is applied to the lower back portion when it is determined that the estimated posture transitions to the unreasonable posture in which the excessive force is applied to the lower back portion, and to control the informing device so as to indicate the correction operation to the wearer.

With the assist device according to the aspect of the present disclosure, the controller informs the wearer using the informing device that the estimated posture of the wearer transitions to an unreasonable posture in which an excessive force is applied to the lower back portion when it is determined that the estimated posture of the wearer transitions to an unreasonable posture in which an excessive force is applied to the lower back portion. The controller indicates to the wearer the correction operation for taking a safe posture in which no excessive force is applied to the lower back portion using the informing device. Consequently, the wearer can take a safe posture in which no excessive force is applied to the lower back portion by performing the correction operation, which can further effectively suppress lumbago by avoiding that an excessive force is applied to the lower back portion.

In the assist device according to the aspect of the present disclosure, the operation state detector may include a pitch angle detector and a lower back portion angle detector. The pitch angle detector may be configured to detect a pitch angle of an upper body of the wearer in a forward direction with respect to a vertical direction. The lower back portion angle detector may be configured to detect a forward tilt angle of the lower back portion with respect to the thigh portion of the wearer. The controller may be configured to estimate a posture of the wearer based on the pitch angle and the forward tilt angle.

With the assist device according to the aspect of the present disclosure, the controller can estimate the posture of the wearer based on the pitch angle of the upper body of the wearer in the forward direction with respect to the vertical direction, which is detected by the pitch angle detector, and the forward tilt angle of the lower back portion with respect to the thigh portion of the wearer, which is detected by the lower back portion angle detector. Consequently, it is possible to estimate the posture of the wearer with a simple configuration, which reduces the weight of the assist device.

In the assist device according to the aspect of the present disclosure, the controller may be configured to store a learning model that has learned the estimated posture. The controller may be configured to acquire the estimated posture based on the learning model when the actuator generates the assist torque.

In the assist device according to the aspect of the present disclosure, the controller may be configured to store a learning model that has learned a determination as to whether or not the estimated posture is the unreasonable posture in which the excessive force is applied to the lower back portion. The controller may be configured to determine, based on the learning model, whether or not the estimated posture is the unreasonable posture in which the excessive force is applied to the lower back portion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
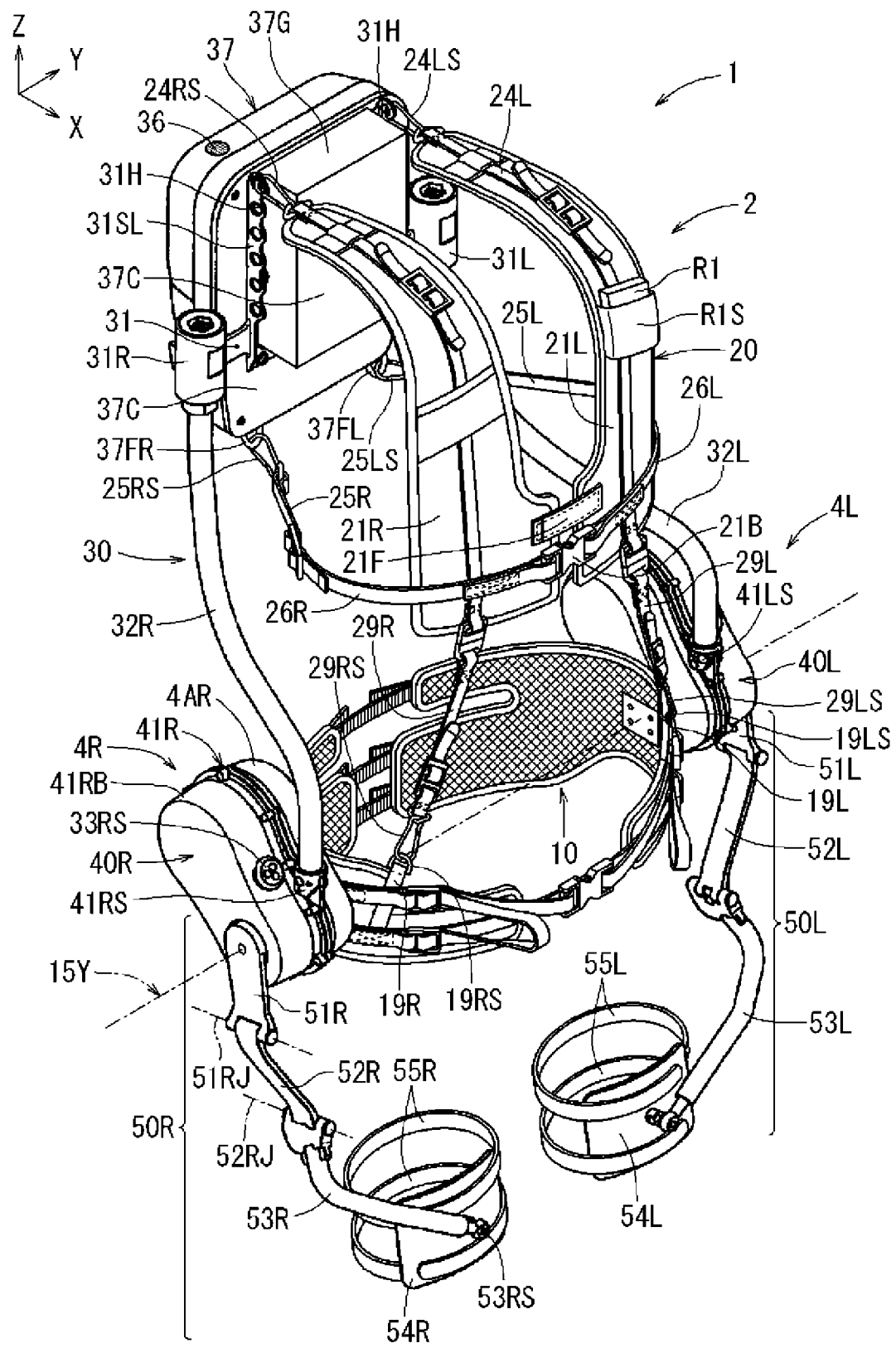
FIG. 1 is a perspective view illustrating the overall configuration of an assist device according to the present embodiment.

An embodiment that embodies an assist device according to the present disclosure will be described in detail below while referring to the drawings. First, a schematic configuration of an assist device 1 according to the present embodiment will be described with reference to FIGS. 1 to 8. In the drawings, the X axis, the Y axis, and the Z axis are orthogonal to each other, and the X-axis direction, the Y-axis direction, and the Z-axis direction correspond to the front direction, the left direction, and the upper direction, respectively, as seen from a wearer wearing the assist device 1.

Figure 2:
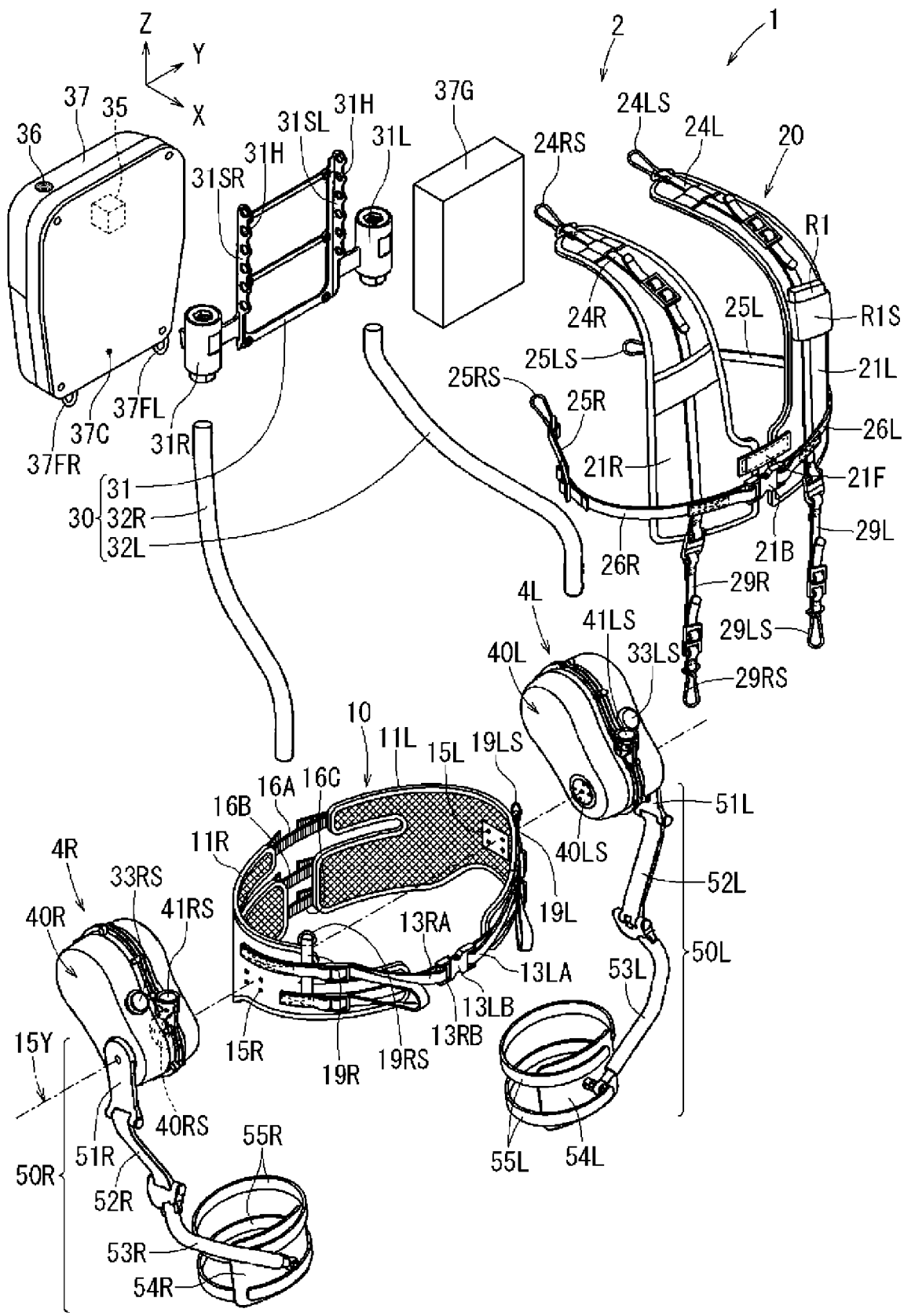
FIG. 2 is an exploded perspective view of the assist device illustrated in FIG. 1.

As illustrated in FIGS. 1 and 2, the assist device 1 is composed of a lower back support portion 10, a jacket portion 20, a frame portion 30, a backpack portion 37, a cushion 37G, a right actuator 4R, a left actuator 4L, etc. A body mounting fixture 2 to be mounted to the upper body of the wearer 6 is composed of the lower back support portion 10, the jacket portion 20, the frame portion 30, the backpack portion 37, and the cushion 37G. The assist device 1 also has an operation unit R1 (a so-called remote controller) that allows the wearer 6 to change the operation mode (such as lift-up assist and lift-down assist), adjust the gain of assist torque or the amount increase rate of assist torque, and confirm the adjusted state etc., and an accommodation portion R1S that accommodates the operation unit R1.

The body mounting fixture 2 is mounted at least around the lower back of the wearer 6. The right actuator 4R and the left actuator 4L are mounted to the lower back support portion 10 that constitutes the body mounting fixture 2 and to the thigh portions of the wearer 6, and assist operation of the thigh portions with respect to the lower back portion of the wearer 6 or operation of the lower back portion with respect to the thigh portions of the wearer 6.

As illustrated in FIGS. 1 and 2, the body mounting fixture 2 has the lower back support portion 10 to be mounted around the lower back of the wearer 6, the jacket portion 20 to be mounted around the shoulders and the chest of the wearer 6, the frame portion 30 to which the jacket portion 20 is connected, and the backpack portion 37 and the cushion 37G that are attached to the frame portion 30. The frame portion 30 is disposed around the back and the lower back of the wearer 6.

The frame portion 30 has a main frame 31, a right sub frame 32R, a left sub frame 32L, etc. The main frame 31 has support bodies 31SR and 31SL in which a plurality of belt connection holes 31H are disposed in the up-down direction at both side edge portions, a connection portion 31R in a generally cylindrical shape, and a connection portion 31L in a generally cylindrical shape. One end (upper end) of the right sub frame 32R is connected to the connection portion 31R. One end (upper end) of the left sub frame 32L is connected to the connection portion 31L. The connection portions 31R and 31L are so-called cylindrical dampers, and have an inner tube and an outer tube disposed coaxially with each other, with a tubular elastic body disposed between the inner tube and the outer tube.

The outer tube of the connection portion 31R is fixed to the right side edge portion of the main frame 31. The one end (upper end) of the right sub frame 32R is fixed to the inner tube of the connection portion 31R. Likewise, the outer tube of the connection portion 31L is fixed to the left side edge portion of the main frame 31. The one end (upper end) of the left sub frame 32L is fixed to the inner tube of the connection portion 31L. Consequently, the right sub frame 32R is turnable about the central axis of the connection portion 31R, and the left sub frame 32L is turnable about the central axis of the connection portion 31L. As illustrated in FIG. 1, the lower end portion of the right sub frame 32R is connected (fixed) to a connection portion 41RS of the right actuator 4R, and the lower end portion of the left sub frame 32L is connected (fixed) to a connection portion 41LS of the left actuator 4L.

As illustrated in FIG. 2, the lower back support portion 10 has a right lower back mounting portion 11R to be mounted around the lower back of the right-side body of the wearer 6 and a left lower back mounting portion 11L to be mounted around the lower back of the left-side body of the wearer 6. The back-side end portion of the right lower back mounting portion 11R and the back-side end portion of the left lower back mounting portion 11L are connected to each other by a back-surface lower back belt 16A, a buttock upper belt 16B, and a buttock lower belt 16C. The front-side end portion of the right lower back mounting portion 11R and the front-side end portion of the left lower back mounting portion 11L are detachably connected to each other by a right lower back fastening belt 13RA, a lower back belt holding member 13RB (lower back buckle), a left lower back fastening belt 13LA, a lower back belt holding member 13LB (lower back buckle), etc.

As illustrated in FIGS. 1 and 2, the lower back support portion 10 has a coupling belt 19R that has a coupling ring 19RS to be coupled to a coupling portion 29RS of the jacket portion 20, and a coupling belt 19L that has a coupling ring 19LS to be coupled to a coupling portion 29LS of the jacket portion 20. As illustrated in FIG. 2, the right lower back mounting portion 11R of the lower back support portion 10 has attachment holes 15R for connection to a coupling portion 40RS of the right actuator 4R at a position intersecting a virtual turning axis 15Y. Meanwhile, the left lower back mounting portion 11L of the lower back support portion 10 has attachment holes 15L for connection to a coupling portion 40LS of the left actuator 4L at a position intersecting the virtual turning axis 15Y.

As illustrated in FIGS. 1 and 2, the backpack portion 37 is attached to the main frame 31 that constitutes the upper end portion of the frame portion 30. The backpack portion 37 has a simple box shape, and houses a controller 61 (see FIG. 6), a motor driver 62 (see FIG. 6), a power source unit 63 (see FIG. 6), a communication device 64 (see FIG. 6), etc. The backpack portion 37 also houses a 3-axis acceleration and angular speed sensor 35 that detects tilt of the upper body of the wearer 6 in each of the X-axis direction, the Y-axis direction, and the Z-axis direction.

Consequently, the controller 61 (see FIG. 6) can detect a pitch angle θP(t) (see FIGS. 7 and 8) of the upper body of the wearer 6 in the forward direction (X-axis direction) with respect to the vertical direction using the 3-axis acceleration and angular speed sensor 35 (pitch angle detector), as described later. A speaker 36 (informing device) is attached to the upper surface portion, for example, of the backpack portion 37. Consequently, the controller 61 can provide voice guidance etc. through the speaker 36, as described later.

As illustrated in FIGS. 1 and 2, the backpack portion 37 has a back support portion 37C on the main frame 31 side. The back support portion 37C is fixed to the main frame 31. As illustrated in FIG. 1, a belt connection portion 24RS of a right shoulder belt 24R is connected to any of the belt connection holes 31H (belt connection portions) of the support body 31SR that is provided in the right side edge portion of the main frame 31. Likewise, as illustrated in FIG. 1, a belt connection portion 24LS of a left shoulder belt 24L is connected to any of the belt connection holes 31H (belt connection portions) of the support body 31SL that is provided in the left side edge portion of the main frame 31. The support bodies 31SR and 31SL may be provided to the backpack portion 37.

A plurality of belt connection holes 31H (belt connection portions) are provided along the up-down direction to enable adjustment of the position in the height direction of the jacket portion 20 with respect to the frame portion 30 in accordance with the physical size of the wearer 6. Thus, the height of the jacket portion 20 can be adjusted to an appropriate position in accordance with the physical size of the wearer 6.

As illustrated in FIGS. 1 and 2, belt connection portions 37FR and 37FL are provided on the right and the left of the lower end of the backpack portion 37. As illustrated in FIG. 1, a belt connection portion 25RS of a right axillary belt 25R is connected to the belt connection portion 37FR. Likewise, as illustrated in FIG. 1, a belt connection portion 25LS of a left axillary belt 25L is connected to the belt connection portion 37FL. The belt connection portions 37FR and 37FL may be provided to the main frame 31.

Even in the case where the upper body of the wearer 6 is tilted forward, the actuators 4R and 4L that output assist torque can be supported appropriately by extending the cushion 37G (or the back support portion 37C), that contacts the back, in the direction of the lower back from the shoulders of the wearer 6. Even in the case where the upper body of the wearer 6 is tilted rightward or leftward, further, the actuators 4R and 4L that output assist torque can be supported more appropriately (to enhance the support rigidity) by the cushion 37G (or the back support portion 37C) contacting the center of bend of the back of the wearer 6.

As illustrated in FIGS. 1 and 2, the jacket portion 20 has a right chest mounting portion 21R to be mounted around the chest of the right-side body of the wearer 6 and a left chest mounting portion 21L to be mounted around the chest of the left-side body of the wearer 6. The right chest mounting portion 21R is connectable to the left chest mounting portion 21L by a surface fastener 21F and a buckle 21B, for example, to allow the wearer 6 to wear and take off the jacket portion 20 easily.

The right chest mounting portion 21R has the right shoulder belt 24R and the belt connection portion 24RS to be connected to the belt connection hole 31H of the main frame 31, and the right axillary belts 26R and 25R and the belt connection portion 25RS to be connected to the belt connection portion 37FR of the backpack portion 37. Meanwhile, the left chest mounting portion 21L has the left shoulder belt 24L and the belt connection portion 24LS to be connected to the belt connection hole 31H of the main frame 31, and the left axillary belts 26L and 25L and the belt connection portion 25LS to be connected to the belt connection portion 37FL of the backpack portion 37.

The right axillary belt 26R and the right axillary belt 25R, and the left axillary belt 26L and the left axillary belt 25L, are connected to each other with an adjustable length so as to be tightly fitted around the chest of the wearer 6 without displacement. The right chest mounting portion 21R has a coupling belt 29R and the coupling portion 29RS to be coupled to the right lower back mounting portion 11R, and the left chest mounting portion 21L has a coupling belt 29L and the coupling portion 29LS to be coupled to the left lower back mounting portion 11L.

As illustrated in FIGS. 1 and 2, the right actuator 4R has a torque generation portion 40R and an output link 50R that serves as a torque transfer portion. Further, as illustrated in FIGS. 1 and 2, the left actuator 4L has a torque generation portion 40L and an output link 50L that serves as a torque transfer portion. The right actuator 4R and the left actuator 4L are configured to be symmetric to each other in the right-left direction. In the following description, the right actuator 4R will be described, and description of the left actuator 4L will be omitted.

Figure 7:
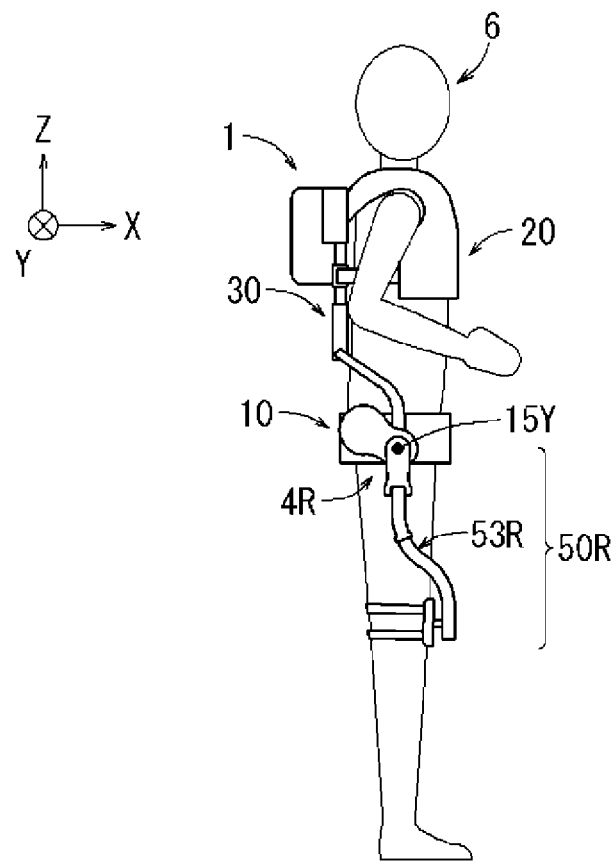
FIG. 7 illustrates a wearer wearing the assist device in an upright state in which the wearer straightens his/her back.

As illustrated in FIG. 1, the torque generation portion 40R has an actuator base portion 41R, a cover 41RB, and a coupling base 4AR. As illustrated in FIG. 7, the output link 50R is turned about a joint (in this case, the hip joint) of the body portion to be assisted (in this case, the thigh portion), and mounted to a body portion to be assisted (in this case, the thigh portion). Assist torque for assisting turning motion of the body portion to be assisted via the output link 50R is generated by an electric motor 47R (see FIG. 3) in the torque generation portion 40R. The assist torque is an assist force, and acts on the assumption that the lower back portion is a rotational axis.

The output link 50R has an assist arm 51R (corresponding to a first link), a second link 52R, a third link 53R, and a thigh mounting portion 54R (corresponding to a body holding portion). The assist arm 51R is turned about the virtual turning axis 15Y by synthesized torque synthesized from the assist torque that is generated by the electric motor 47R in the torque generation portion 40R and target person torque generated by operation of the thigh portion of the wearer 6.

One end of the second link 52R is connected to the distal end of the assist arm 51R so as to be turnable about a turning axis 51RJ. One end of the third link 53R is connected to the other end of the second link 52R so as to be turnable about the turning axis 52RJ. The thigh mounting portion 54R is connected to the other end of the third link 53R via a third joint portion 53RS (in this case, a spherical joint).

The thigh mounting portion 54R is provided with a thigh belt 55R to be wound around the thigh portion of the wearer 6. The thigh belt 55R is formed from a stretchable elastic body, and one end of the thigh belt 55R is fixed to the thigh mounting portion 54R while having a surface fastener on the other end of the thigh belt 55R. A surface fastener is provided to the thigh mounting portion 54R at a position facing the other end of the thigh belt 55R to allow the wearer 6 to wear and take off the thigh mounting portion 54R and the thigh belt 55R on and from the thigh portion easily.

Figure 3:
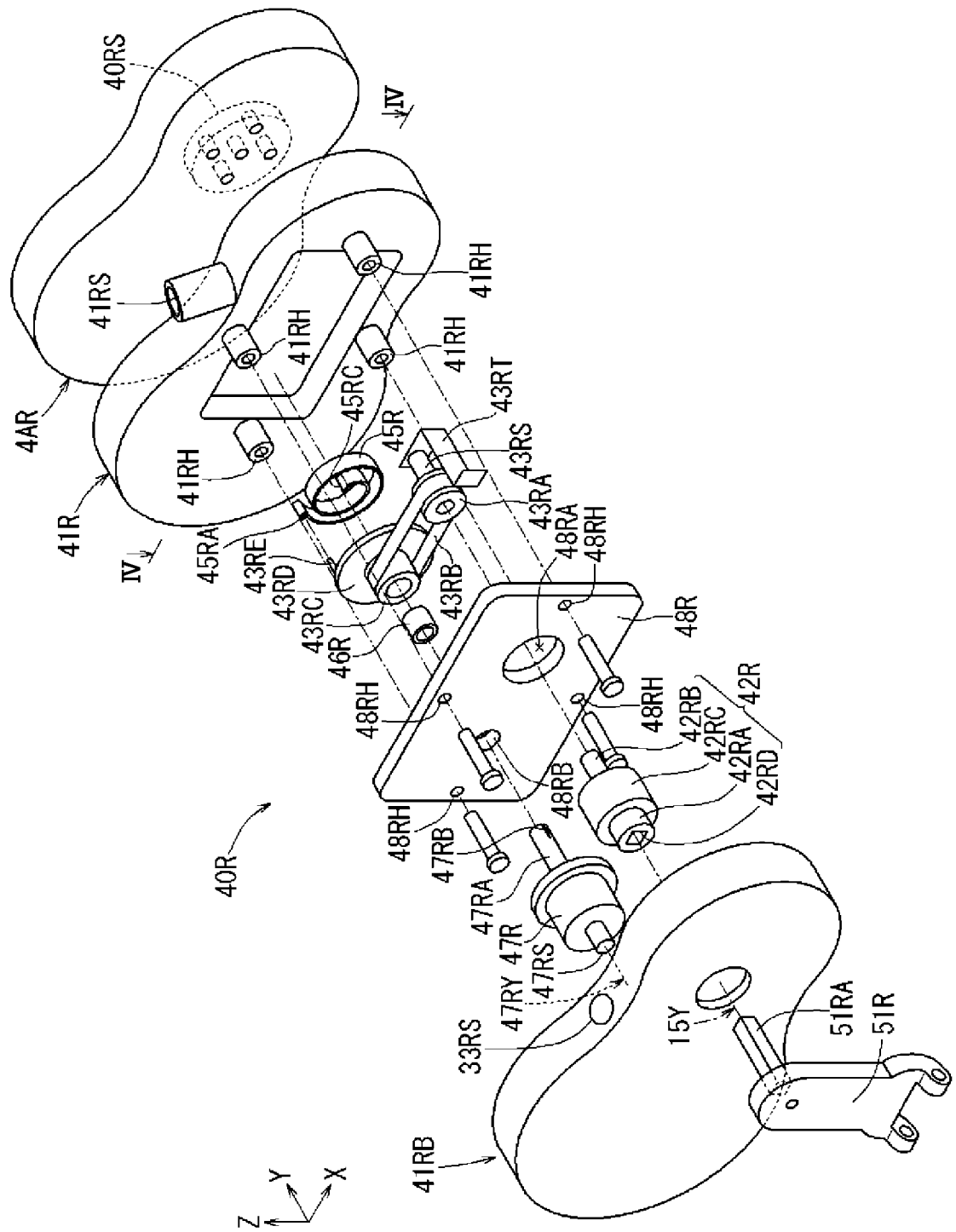
FIG. 3 is an exploded perspective view illustrating an example of the internal structure of a right actuator.
Figure 4:
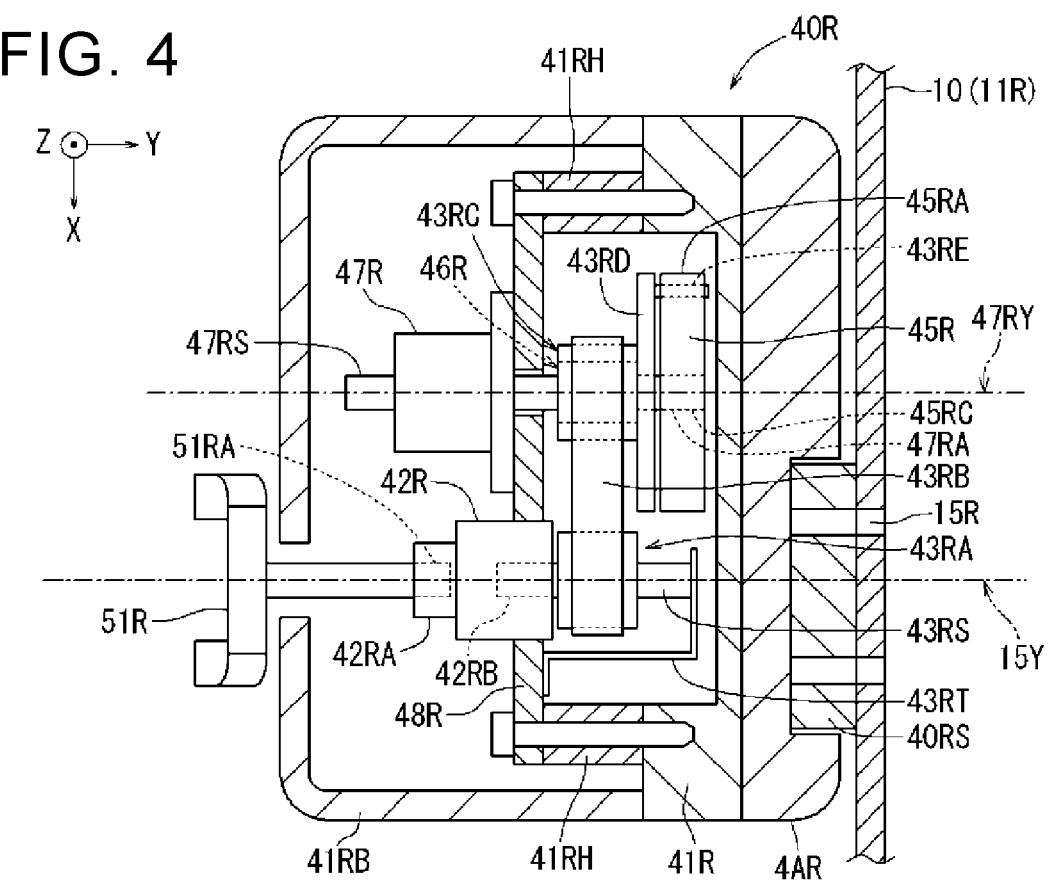
FIG. 4 is a sectional view illustrating an example of the internal structure of the right actuator.

Next, the configuration of the torque generation portion 40R will be described with reference to FIGS. 3 and 4. FIG. 4 is a sectional view taken along the line IV-IV in FIG. 3. As illustrated in FIGS. 3 and 4, the cover 41RB houses therein a speed reducer 42R, a pulley 43RA, a transfer belt 43RB, a pulley 43RC that has a flange portion 43RD, a spiral spring 45R, a bearing 46R, the electric motor 47R, a sub frame 48R, etc. The assist arm 51R that has a shaft portion 51RA is disposed outside the cover 41RB.

Take-out ports 33RS and 33LS (see FIG. 2) for cables for drive, control, and communication of the electric motors 47R and 47L (see FIG. 6) are provided at portions of the actuators 4R and 4L that are close to the frame portion 30. Cables (not illustrated) connected to the cable take-out ports 33RS and 33LS (see FIG. 2) are disposed along the frame portion 30, and connected to the backpack portion 37.

As illustrated in FIG. 4, the torque generation portion 40R has the actuator base portion 41R to which the sub frame 48R that incorporates the electric motor 47R etc. is attached, the cover 41RB that is attached to one side of the actuator base portion 41R, and the coupling base 4AR that is attached to the other side of the actuator base portion 41R. The coupling base 4AR is provided with the coupling portion 40RS that is turnable about the virtual turning axis 15Y.

As illustrated in FIGS. 3 and 4, an output link turning angle detector (lower back portion angle detector) 43RS (a turning angle sensor, for example) that detects the turning angle of the assist arm 51R with respect to the actuator base portion 41R, that is, a forward tilt angle θR(t) (see FIG. 8) of the lower back portion with respect to the right thigh portion of the wearer 6, is connected to the pulley 43RA that is connected to a speed increasing shaft 42RB of the speed reducer 42R. The output link turning angle detector 43RS is an encoder or an angle sensor, for example, and outputs a detection signal corresponding to the rotational angle to the controller 61 (see FIG. 6). The electric motor 47R is provided with a motor rotational angle detector 47RS that can detect the rotational angle of a motor shaft (corresponding to the output shaft). The motor rotational angle detector 47RS is an encoder or an angle sensor, for example, and outputs a detection signal corresponding to the rotational angle to the controller 61 (see FIG. 6).

As illustrated in FIG. 3, the sub frame 48R is formed with a through hole 48RA to which a speed reducer housing 42RC of the speed reducer 42R is fixed, and a through hole 48RB through which an output shaft 47RA of the electric motor 47R is inserted. The shaft portion 51RA of the assist arm 51R is fitted in a hole portion 42RD of a speed reducing shaft 42RA of the speed reducer 42R. The speed reducer housing 42RC of the speed reducer 42R is fixed to the through hole 48RA of the sub frame 48R.

Consequently, the assist arm 51R is supported so as to be turnable about the virtual turning axis 15Y with respect to the actuator base portion 41R, and turned together with the speed reducing shaft 42RA. The electric motor 47R is fixed to the sub frame 48R. The output shaft 47RA is inserted through the through hole 48RB of the sub frame 48R. The sub frame 48R is fixed to attachment portions 41RH of the actuator base portion 41R by fastening members such as bolts.

As illustrated in FIG. 3, the pulley 43RA is connected to the speed increasing shaft 42RB of the speed reducer 42R, and the output link turning angle detector 43RS is connected to the pulley 43RA. A support member 43RT fixed to the sub frame 48R is connected to the output link turning angle detector 43RS. Consequently, the output link turning angle detector 43RS can detect the turning angle of the speed increasing shaft 42RB with respect to the sub frame 48R (i.e. with respect to the actuator base portion 41R).

Moreover, the turning angle of the assist arm 51R has been increased by the speed increasing shaft 42RB of the speed reducer 42R, and thus the output link turning angle detector 43RS and the controller 61 (see FIG. 6) can detect the turning angle of the assist arm 51R with a higher resolution. The controller 61 can execute more precise control by detecting the turning angle of the output link with a higher resolution. The shaft portion 51RA of the assist arm 51R, the speed reducer 42R, the pulley 43RA, and the output link turning angle detector 43RS are disposed coaxially with each other along the virtual turning axis 15Y.

The speed reducer 42R has a speed reduction ratio n (1<n), and turns the speed increasing shaft 42RB by a turning angle nθR(t) in the case where the speed reducing shaft 42RA is turned by a turning angle θR(t). The speed reducer 42R turns the speed reducing shaft 42RA by a turning angle θR(t) in the case where the speed increasing shaft 42RB is turned by a turning angle nθR(t). The transfer belt 43RB is wound around the pulley 43RA to which the speed increasing shaft 42RB of the speed reducer 42R is connected, and the pulley 43RC. Thus, target person torque from the assist arm 51R is transferred to the pulley 43RC via the speed increasing shaft 42RB, and assist torque from the electric motor 47R is transferred to the speed increasing shaft 42RB via the spiral spring 45R and the pulley 43RC.

The spiral spring 45R has a spring constant Ks, and has a spiral shape with an inside end portion 45RC on the center side and with an outside end portion 45RA on the outer peripheral side. The inside end portion 45RC of the spiral spring 45R is fitted in a groove portion 47RB formed in the output shaft 47RA of the electric motor 47R. The outside end portion 45RA of the spiral spring 45R is wound in a cylindrical shape, and fitted with a transfer shaft 43RE provided to the flange portion 43RD of the pulley 43RC to be supported by the transfer shaft 43RE (the pulley 43RC is integrated with the flange portion 43RD and the transfer shaft 43RE).

The pulley 43RC is supported so as to be turnable about a turning axis 47RY, and the transfer shaft 43RE that projects toward the spiral spring 45R is provided in the vicinity of the outer peripheral edge portion of the flange portion 43RD that is integrated with the pulley 43RC. The transfer shaft 43RE is fitted with the outside end portion 45RA of the spiral spring 45R, and moves the position of the outside end portion 45RA about the turning axis 47RY. The bearing 46R is provided between the output shaft 47RA of the electric motor 47R and the pulley 43RC.

That is, the output shaft 47RA is not fixed to the pulley 43RC, and the output shaft 47RA is freely rotatable with respect to the pulley 43RC. The pulley 43RC is rotationally driven by the electric motor 47R via the spiral spring 45R. With the configuration described above, the output shaft 47RA of the electric motor 47R, the bearing 46R, the pulley 43RC that has the flange portion 43RD, and the spiral spring 45R are disposed coaxially with each other along the turning axis 47RY.

The spiral spring 45R stores the assist torque that is transferred from the electric motor 47R, stores the target person torque that is transferred by operation of the thigh portion of the wearer 6 by way of the assist arm 51R, the speed reducer 42R, the pulley 43RA, and the pulley 43RC, and as a result stores synthesized torque synthesized from the assist torque and the target person torque. The synthesized torque that is stored in the spiral spring 45R turns the assist arm 51R via the pulley 43RC, the pulley 43RA, and the speed reducer 42R. With the configuration described above, the output shaft 47RA of the electric motor 47R is connected to an output link (in the case of FIG. 3, the assist arm 51R) via the speed reducer 42R that reduces the rotational angle of the output shaft 47RA.

The synthesized torque that is stored in the spiral spring 45R is calculated based on the amount of variation in the angle from the no-load state and the spring constant, and calculated based on the turning angle of the assist arm 51R (that is calculated by the output link turning angle detector 43RS), the rotational angle of the output shaft 47RA of the electric motor 47R (that is calculated by the motor rotational angle detector 47RS), and the spring constant Ks of the spiral spring 45R, for example. The target person torque is extracted from the calculated synthesized torque, and the assist torque that corresponds to the target person torque is output from the electric motor.

As illustrated in FIG. 4, the torque generation portion 40R of the right actuator 4R has the coupling portion 40RS that is turnable about the virtual turning axis 15Y. As illustrated in FIGS. 1 and 2, the coupling portion 40RS is coupled (fixed) by coupling members such as bolts via the attachment holes 15R of the lower back support portion 10. As illustrated in FIGS. 1 and 2, the lower end portion of the right sub frame 32R of the frame portion 30 is connected (fixed) to the connection portion 41RS of the right actuator 4R.

Likewise, as illustrated in FIGS. 1 and 2, the coupling portion 40LS of the torque generation portion 40L of the left actuator 4L is coupled (fixed) by coupling members such as bolts via the attachment holes 15L of the lower back support portion 10. As illustrated in FIGS. 1 and 2, the lower end portion of the left sub frame 32L of the frame portion 30 is connected (fixed) to the connection portion 41LS of the left actuator 4L.

That is, in FIG. 2, the lower back support portion 10 and the frame portion 30 are fixed to the torque generation portion 40R of the right actuator 4R, and the lower back support portion 10 and the frame portion 30 are fixed to the torque generation portion 40L of the left actuator 4L. The right actuator 4R, the left actuator 4L, and the frame portion 30 are integrated with each other, and are turnable with respect to the lower back support portion 10 through the coupling portions 40RS and 40LS that are turnable about the virtual turning axis 15Y (see FIGS. 7 and 8).

Next, a schematic configuration of the operation unit R1 that allows the wearer 6 to easily adjust etc. the assist state of the assist device 1 will be described with reference to FIGS. 5 and 6. As illustrated in FIG. 6, the operation unit R1 is connected to the controller 61 in the backpack portion 37 (see FIG. 1) through a wired or wireless communication line R1T. A controller R1E of the operation unit R1 can transmit and receive information to and from the controller 61 via a communication device R1EA, and the controller 61 can transmit and receive information to and from the controller R1E in the operation unit R1 via the communication device 64. As illustrated in FIG. 1, the wearer 6 can accommodate the operation unit R1 in the accommodation portion R1S such as a pocket provided to the jacket portion 20, for example, in the case where the wearer 6 does not operate the operation unit R1 (see FIG. 1).

Figure 5:
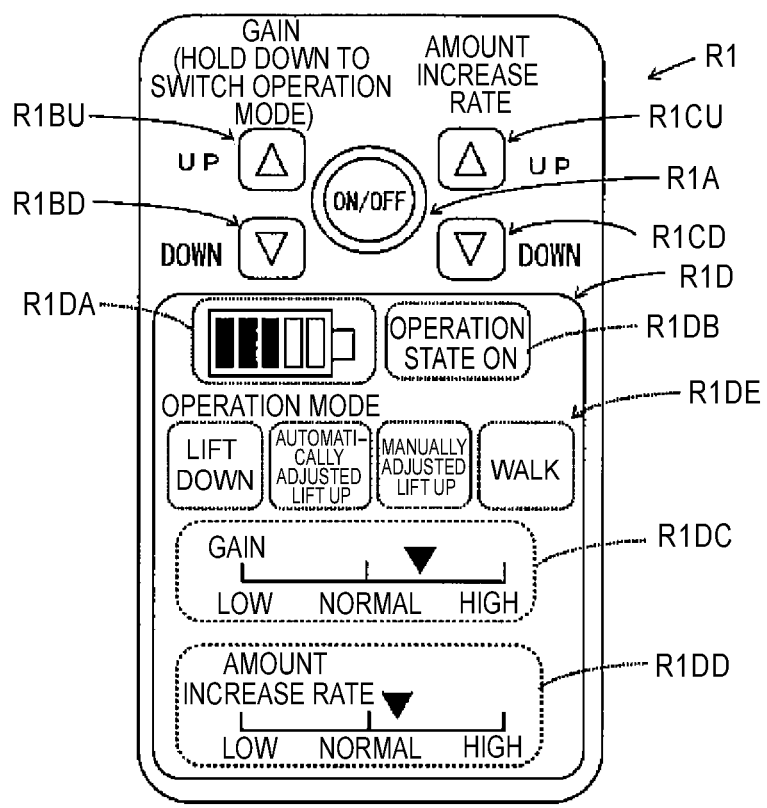
FIG. 5 illustrates an example of the appearance of an operation unit.
Figure 6:
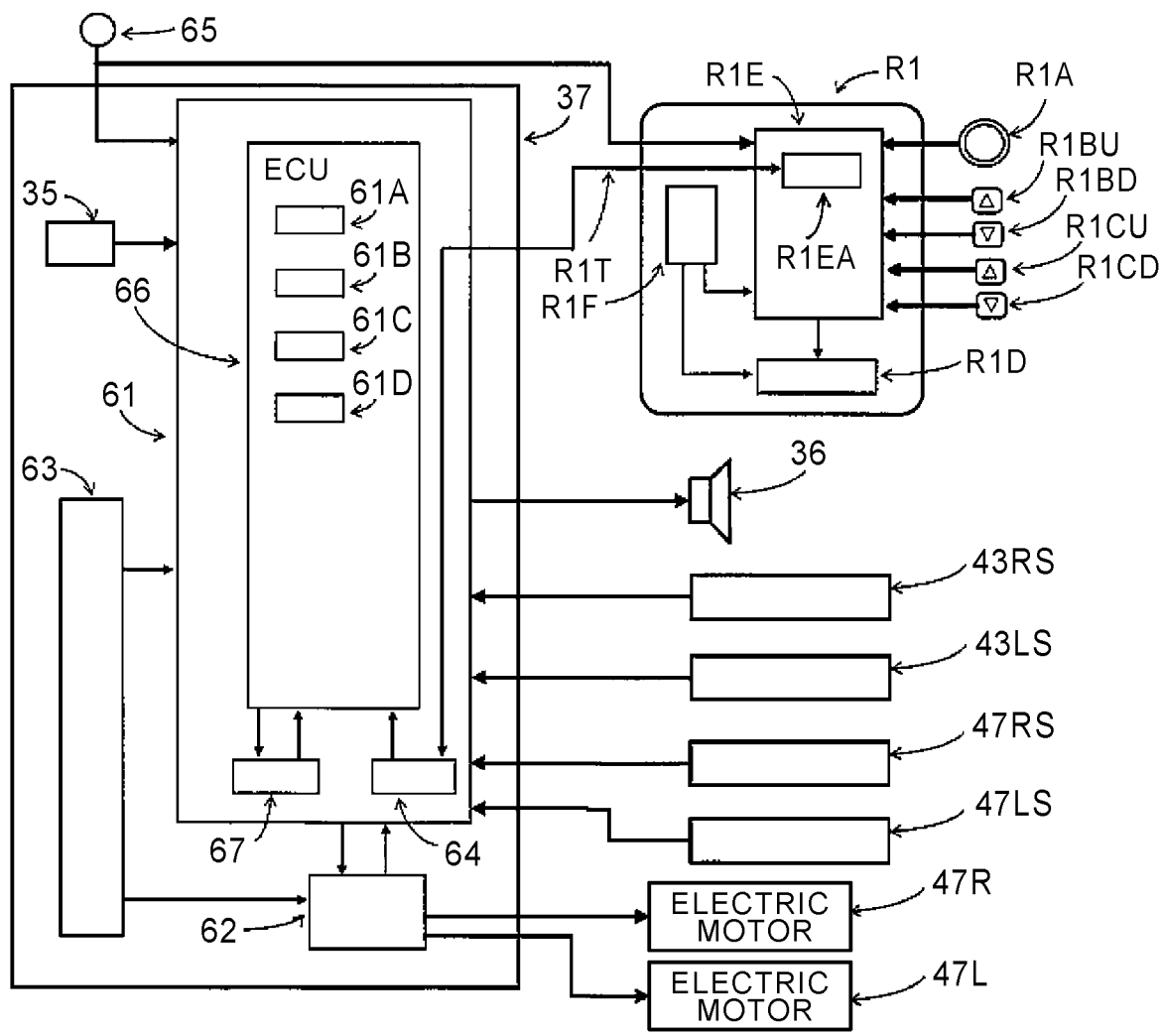
FIG. 6 illustrates inputs to and outputs from a controller.

As illustrated in FIG. 5, the operation unit R1 has a main operation portion R1A, a gain up operation portion R1BU, a gain down operation portion R1BD, an amount increase rate up operation portion R1CU, an amount increase rate down operation portion R1CD, a display portion R1D, etc. As illustrated in FIG. 6, the operation unit R1 has therein the controller R1E, an operation unit power source R1F, etc. The main operation portion R1A, the gain up operation portion R1BU, the gain down operation portion R1BD, the amount increase rate up operation portion R1CU, and the amount increase rate down operation portion R1CD preferably do not project from a surface on which such portions are disposed, in order to prevent an erroneous operation when the operation unit R1 is accommodated in the accommodation portion R1S (see FIG. 1).

The main operation portion R1A is a switch that is operable by the wearer 6 to start and stop assist control by the assist device 1. As illustrated in FIG. 6, a main power source switch 65 for starting and stopping the entire assist device 1 is provided to the backpack portion 37, for example. When the main power source switch 65 is turned on, the controller 61 and the controller R1E are started. When the main power source switch 65 is turned off, operation of the controller 61 and the controller R1E is stopped.

As illustrated in FIG. 5, a display area R1DB on the display portion R1D of the operation unit R1 displays whether the current operation state of the assist device 1 is on (operating) or off (stopped), for example. The gain up operation portion R1BU is a switch that is operable by the wearer 6 to increase the gain of the assist torque that is generated by the assist device 1. The gain down operation portion R1BD is a switch that is operable by the wearer 6 to decrease the gain of the assist torque that is generated by the assist device 1.

For example, the controller R1E increments the stored gain number by 1 in the order of "0", "1", "2", and "3" each time the gain up operation portion R1BU is operated by the wearer 6, and decrements the gain number by 1 in the order of "3", "2", "1", and "0" each time the gain down operation portion R1BD is operated. While the gain number has four values of "0" to "3" in the described example, the number of such values is not limited to four. As illustrated in FIG. 6, the controller R1E performs display that corresponds to the current gain number in the display area R1DC on the display portion R1D of the operation unit R1, for example.

In the case where the gain up operation portion R1BU is continually held down for five seconds or longer, for example, the gain up operation portion R1BU functions as an operation mode changeover switch. In the case where the gain up operation portion R1BU is continually held down, the operation mode (mode number) is switched sequentially in the order of "1 (lift-down assist)"→"2 (automatically adjusted lift-up assist)"→"3 (manually adjusted lift-up assist)" each time the gain up operation portion R1BU is pressed. As illustrated in FIG. 5, the controller R1E performs display that matches the current operation mode in a display area R1DE on the display portion R1D of the operation unit R1, for example. A "walk" mode cannot be selected from the gain up operation portion R1BU, but the controller 61 (see FIG. 6) automatically switches to the "walk" mode in the case where the controller 61 recognizes that the wearer 6 is "walking".

The amount increase rate up operation portion R1CU is a switch that is operable by the wearer 6 to increase the rate of increase in the amount of assist torque generated by the assist device 1. The amount increase rate down operation portion R1CD is a switch that is operable by the wearer 6 to decrease the rate of increase in the amount of assist torque generated by the assist device 1. For example, the controller R1E increments the stored rate number, which corresponds to the amount increase rate, by 1 in the order of "−1", "0", "1", "2", "3", and "4" each time the amount increase rate up operation portion R1CU is operated.

Meanwhile, the controller R1E decrements the stored rate number, which corresponds to the amount increase rate, by 1 in the order of "4", "3", "2", "1", "0", and "−1" each time the amount increase rate down operation portion R1CD is operated. As illustrated in FIG. 5, the controller R1E performs display of the rate of increase in the amount of assist torque that corresponds to the current rate number in a display area R1DD on the display portion RAD of the operation unit R1, for example. The number of values of the rate number is not limited to six of "−1" to "4".

The controller R1E of the operation unit R1 transmits operation information to the controller 61 (see FIG. 6) via the communication device R1EA (see FIG. 6) at intervals of a predetermined time (e.g. at intervals of several milliseconds to several hundreds of milliseconds) or each time any of the main operation portion R1A, the gain up operation portion R1BU, the gain down operation portion R1BD, the amount increase rate up operation portion R1CU, and the amount increase rate down operation portion R1CD is operated. The operation information includes the stop command or the start command, the mode number, the gain number, the rate number, etc. described above.

When the operation information is received via the communication device 64, the controller 61 (see FIG. 6) that is housed in the backpack portion 37 stores the received operation information. The controller 61 transmits battery information, which indicates the state of a battery of the power source unit 63 that is used to drive the assist device 1, and response information, which includes assist information that indicates the assist state etc., via the communication device 64 (see FIG. 6). The battery information that is included in the response information includes the remaining capacity of the power source unit 63 etc.

The assist information that is included in the response information includes error information that indicates the content of an abnormality in the case where an abnormality is found in the assist device 1, for example. As illustrated in FIG. 5, the controller R1E of the operation unit R1 displays the battery remaining capacity etc. in a display area R1DA on the display portion IUD of the operation unit R1, for example, and displays error information at any position on the display portion MD in the case where such error information is included.

The controller 61 (see FIG. 6) that has receive the operation information from the controller R1E starts the assist device 1 in the case where the received operation information includes a start command, and stops the assist device 1 in the case where the received operation information includes a stop command. In the case where a mode number that represents an operation mode is received, for example, the controller 61 stores an operation mode corresponding to the received mode number. In the case where a gain number is received, for example, the controller 61 stores the value (0 to 3) of a gain CP corresponding to the gain number. In the case where a rate number is received, for example, the controller 61 stores a (right) amount increase rate CSR (right rate number: −1 to 4) and a (left) amount increase rate CSL (left rate number: −1 to 4) in correspondence with the rate number.

As has been described above, the wearer 6 can easily make an adjustment to achieve a desired assist state by operating the operation unit R1. The wearer 6 can easily understand the state of the assist device 1 with the battery remaining capacity, error information, etc. displayed on the display portion IUD of the operation unit R1. The form of various types of information displayed on the display portion R1D is not limited to the example illustrated in FIG. 5.

Next, the control configuration of the assist device 1 will be described with reference to FIGS. 6 to 8. As illustrated in FIG. 6, the assist device 1 includes the controller 61 that controls the entire assist device 1. In the example illustrated in FIG. 6, the controller 61, the motor driver 62, the power source unit 63, etc. are housed in the backpack portion 37. The controller 61 has an Electronic Control Unit (ECU) 66, a storage device 67 (such as a hard disk drive (HDD), for example, that stores control programs, various parameters, etc.), the communication device 64, etc., for example. The controller 61 has a posture estimation unit 61A, a posture determination unit 61B, a transition determination unit 61C, a correction operation determination unit 61D, etc. to be described later.

The ECU 66 is a well-known one that includes a CPU, a RAM, a ROM, a timer, a back-up RAM, etc. (not illustrated). The CPU executes a variety of computation processes based on various programs and various parameters stored in the ROM. The RAM temporarily stores the results of computation by the CPU, data input from the detectors, etc. The back-up RAM stores data etc. that should be stored when the assist device 1 is stopped, for example.

The motor driver 62 is an electronic circuit that outputs a drive current that drives the electric motors 47R and 47L based on a control signal from the controller 61. The power source unit 63 is a lithium-ion battery, for example, and supplies power to the controller 61 and the motor driver 62. The operation information from the operation unit R1 is input to the ECU 66 via the communication device 64.

The motor rotational angle detectors 47RS and 47LS, the output link turning angle detectors 43RS and 43LS, the 3-axis acceleration and angular speed sensor 35, the speaker 36, etc. are electrically connected to the controller 61. The controller 61 calculates a rotational angle $\theta_{rM}$ of the motor shaft of each of the electric motors 47R and 47L based on a detection signal input from each of the motor rotational angle detectors 47RS and 47LS, and outputs a control signal that corresponds to the calculated rotational angle $\theta_{rM}$ to the motor driver 62.

Figure 8:
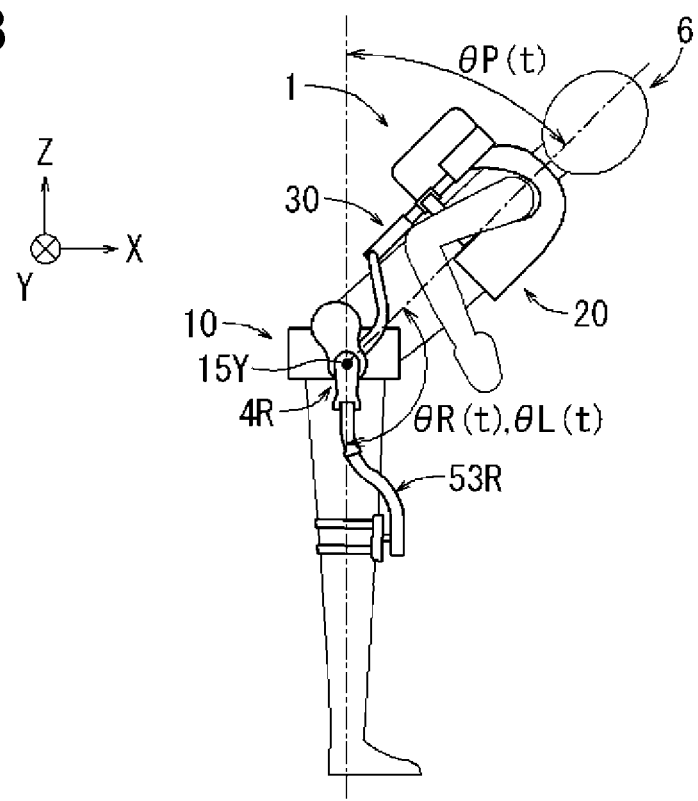
FIG. 8 illustrates a state in which the wearer takes a forward tilt posture with a frame portion etc. turned about a virtual turning axis from the state illustrated in FIG. 7.

The ECU 66 detects the pitch angle $\theta P(t)$ of the upper body of the wearer 6 in the forward direction (X-axis direction) with respect to the vertical direction (Z-axis direction), as illustrated in FIGS. 7 and 8, based on a detection signal for the acceleration and the angular speed input from the 3-axis acceleration and angular speed sensor 35. The ECU 66 also detects the forward tilt angle $\theta R(t)$ of the lower back portion with respect to the right thigh portion of the wearer 6 and the forward tilt angle $\theta L(t)$ of the lower back portion with respect to the left thigh portion, as illustrated in FIGS. 7 and 8, based on detection signals input from the output link turning angle detectors 43RS and 43LS.

[Lumbago Suppression Process]

Figure 9:
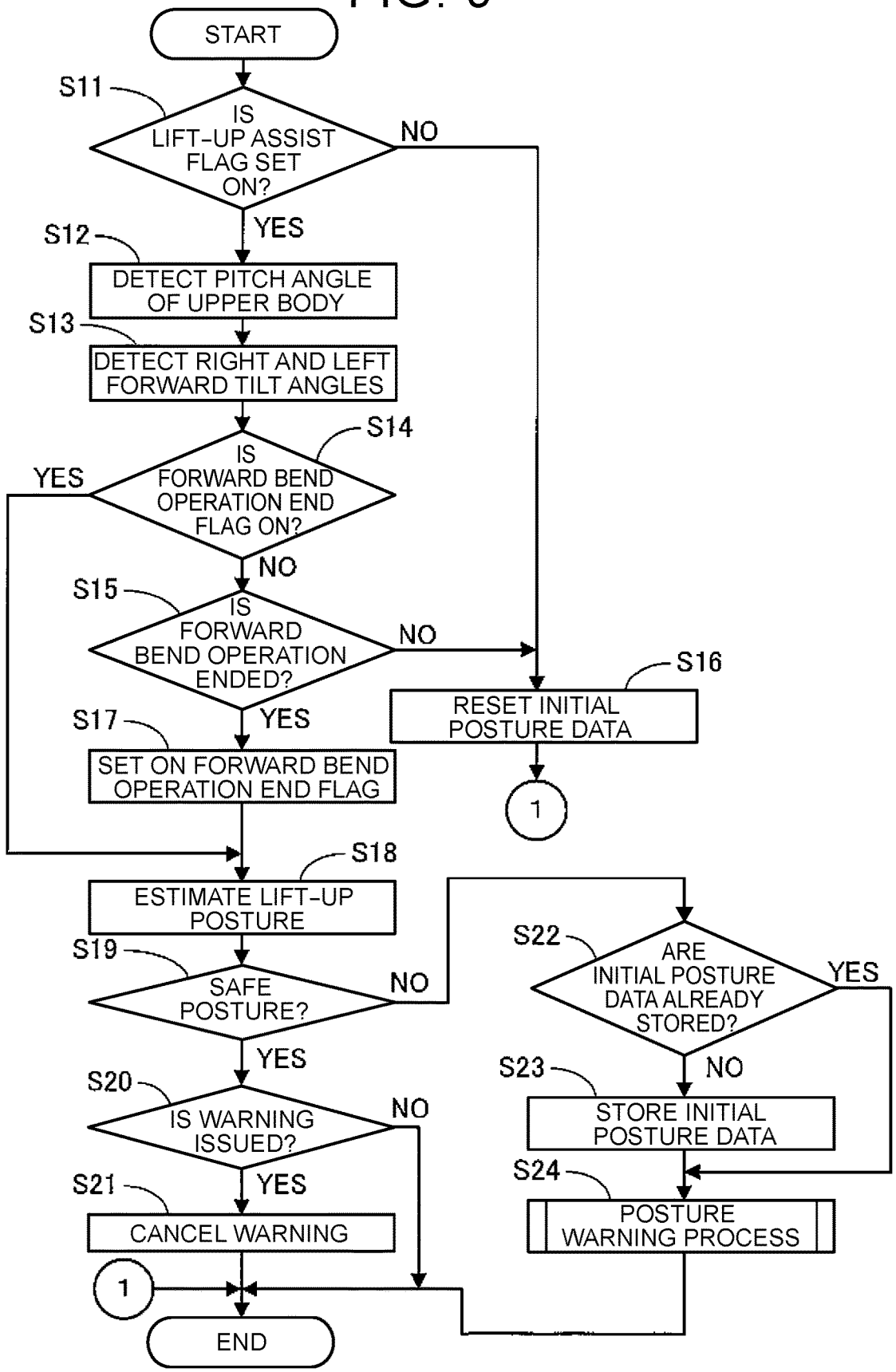
FIG. 9 is a flowchart illustrating an example of a "lumbago suppression process" executed by the controller of the assist device.
Figure 10:
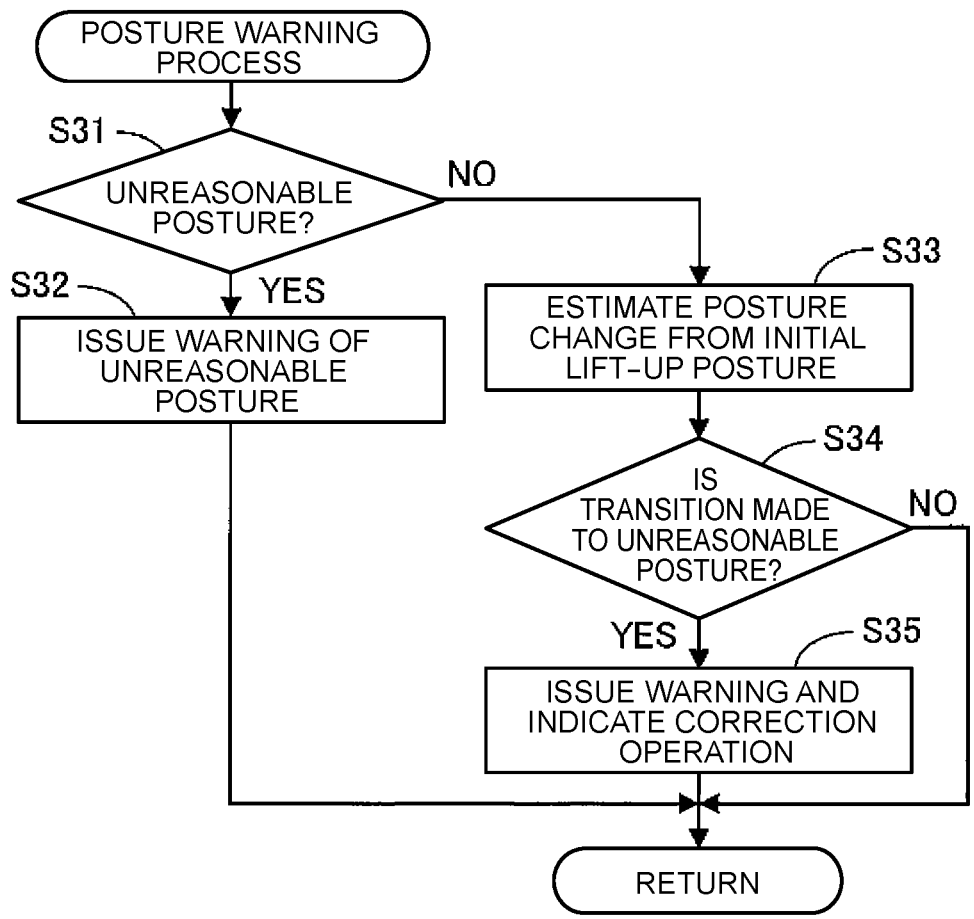
FIG. 10 is a sub flowchart illustrating an example of a sub process of a "posture warning process" in FIG. 9.

Next, a "lumbago suppression process" executed by the ECU 66 at the start of lift-up operation by the wearer 6 in the assist device 1 configured as described above will be described with reference to FIGS. 9 to 13. A program indicated in the flowcharts in FIGS. 9 and 10 is stored in the storage device 67, and started by the ECU 66 every predetermined time (e.g. every several milliseconds to every several tens of milliseconds) when the wearer 6 turns on the main operation portion R1A. When the process is started, the ECU 66 proceeds to step S11.

As illustrated in FIG. 9, in step S11, the ECU 66 reads a lift-up assist flag from the RAM (not illustrated), and determines whether or not the flag is set to "ON". The lift-up assist flag is set to "OFF" when the controller 61 is started, and stored in the RAM (not illustrated). The lift-up assist flag is set to "ON" when the wearer 6 selects the automatically adjusted lift-up assist operation mode or manually adjusted lift-up assist operation mode using the operation unit R1. On the other hand, the lift-up assist flag is set to "OFF" when the wearer 6 selects the lift-down assist operation mode using the operation unit R1 or when the operation mode is automatically switched to the "walk" mode.

In the case where it is determined that the lift-up assist flag is set to "OFF" (S11: NO), the ECU 66 proceeds to step S16 to be described later. In the case where it is determined that the lift-up assist flag is set to "ON" (S11: YES), on the other hand, the ECU 66 proceeds to step S12. In step S12, the ECU 66 detects the pitch angle $\theta P(t)$ of the upper body of the wearer 6 in the forward direction (X-axis direction) with respect to the vertical direction (Z-axis direction) based on a detection signal for the acceleration and the angular speed input from the 3-axis acceleration and angular speed sensor 35, and stores the detected angle in the RAM (not illustrated) chronologically.

Subsequently, in step S13, the ECU 66 detects the forward tilt angle $\theta R(t)$ of the lower back portion with respect to the right thigh portion of the wearer 6 and the forward tilt angle θL(t) of the lower back portion with respect to the left thigh portion based on detection signals input from the output link turning angle detectors 43RS and 43LS, and stores the detected angles in the RAM (not illustrated) chronologically. After that, in step S14, the ECU 66 reads from the RAM (not illustrated) a forward bend operation end flag that indicates the end of forward bend operation, and determines whether or not the flag is set to "ON". The forward bend operation end flag is set to "OFF" when the controller 61 is started, and stored in the RAM (not illustrated).

In the case where it is determined that the forward bend operation end flag is set to "ON" (S14: YES), the ECU 66 proceeds to step S18 to be described later. In the case where it is determined that the forward bend operation end flag is set to "OFF" (S14: NO), on the other hand, the ECU 66 proceeds to step S15. In step S15, the ECU 66 determines whether or not the forward bend operation of the wearer 6 is ended.

Figure 11:
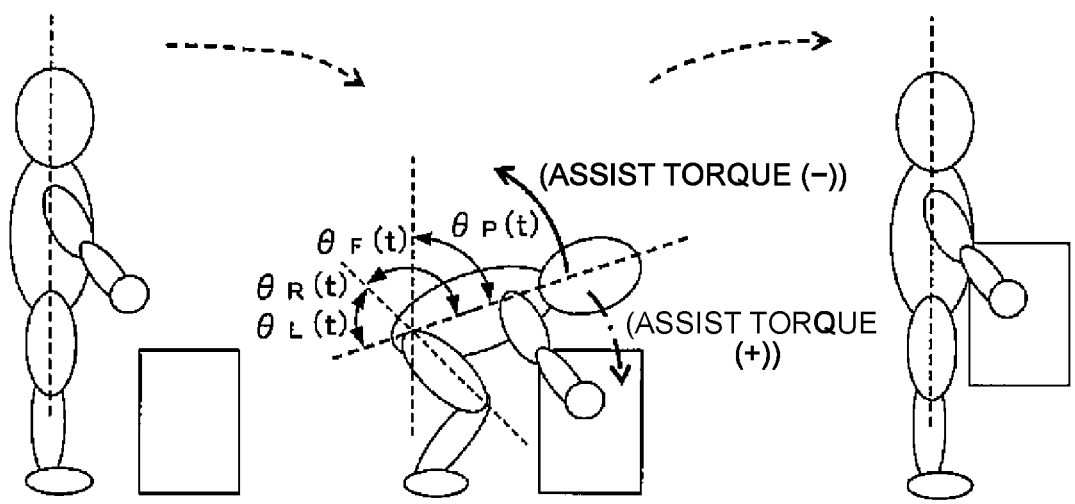
FIG. 11 illustrates how the wearer performs lift-up work.

Specifically, the ECU 66 reads from the RAM the forward tilt angles θR(t) and θL(t) of the lower back portion with respect to the right and left thigh portions that are detected in step S13, calculates a forward tilt angle θF(t) of the wearer 6 illustrated in FIG. 11 using the following formula (1), and stores the calculated angle in the RAM chronologically. Subsequently, the ECU 66 determines whether or not an increase in the forward bend angle θF(t) of the wearer 6 is substantially stopped.

$$\theta F(t)=180°-(\theta R(t)+\theta L(t))/2 \qquad (1)$$

Figure 12:
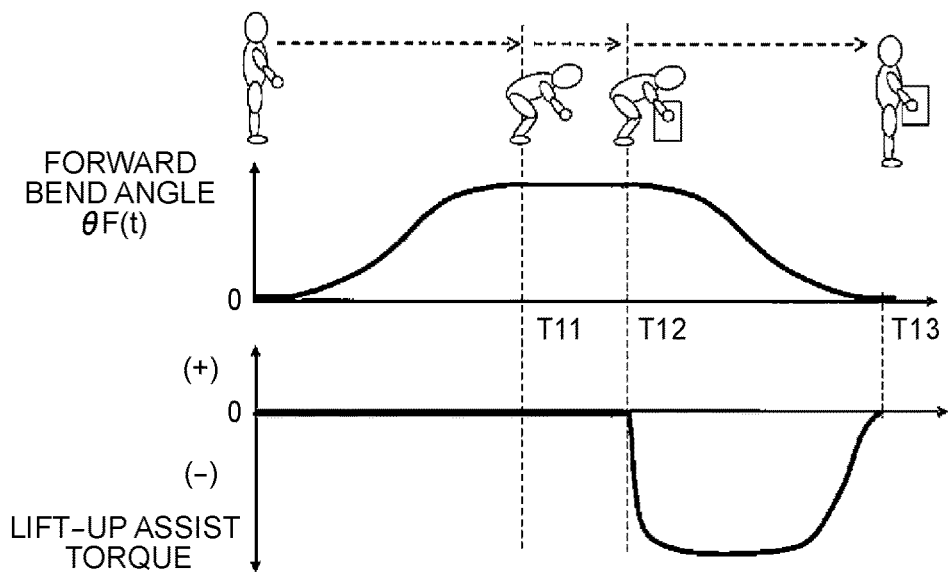
FIG. 12 illustrates how the forward bend angle and the lift-up assist torque are varied with respect to the time when the wearer performs the lift-up work.

In the case where it is determined that the forward bend operation is not ended, that is, in the case where it is determined that the forward bend angle θF(t) is increasing (S15: NO) as indicated in FIG. 12, the ECU 66 proceeds to step S16. In step S16, the ECU 66 reads the pitch angle θP(t) of the upper body of the wearer 6 in the forward direction (X-axis direction) with respect to the vertical direction (Z-axis direction) and the forward tilt angles θR(t) and θL(t) of the lower back portion with respect to the right and left thigh portions, which are stored in the RAM as initial posture data that indicate the lift-up posture of the wearer 6 at the start of lift-up work, initializes such angles (e.g. substitutes "0"), stores the initialized angles in the RAM as the initial posture data again, and ends the process.

On the other hand, in the case where it is determined that the forward bend operation is ended, that is, in the case where it is determined that the forward bend angle θF(t) is not increasing (S15: YES) as indicated in FIG. 12, the ECU 66 proceeds to step S17. For example, as indicated in FIG. 12, the wearer 6 who is in an upright state starts forward bend operation at time 0, and gradually increases the forward bend angle θF(t). At time T11, the forward bend operation is ended, and the increase in the forward bend angle θF(t) is substantially stopped.

As indicated in FIG. 12, the ECU 66 controls drive of the electric motors 47R and 47L with predetermined lift-up assist torque after time T12 when the wearer 6 starts lift-up operation and until time T13 when the forward bend angle θF(t) of the wearer 6 is decreased to substantially "0 degrees". The ECU 66 reads from the RAM (not illustrated) the forward bend operation end flag that indicates the end of forward bend operation at time T13, sets the flag to "OFF", and stores the flag in the RAM again.

As illustrated in FIG. 11, the lift-up assist torque is assist torque in the lift-up direction (−(negative) side in FIG. 11), and reduces a burden on the lower back portion of the wearer 6 and appropriately assists the wearer 6 in performing lift-up work. The predetermined lift-up assist torque is stored in the storage device 67 in advance.

Subsequently, as illustrated in FIG. 9, in step S17, the ECU 66 reads from the RAM (not illustrated) the forward bend operation end flag that indicates the end of forward bend operation, sets the flag to "ON", and stores the flag in the RAM again. After that, in step S18, the ECU 66 reads the pitch angle θP(t) of the upper body of the wearer 6 in the forward direction with respect to the vertical direction, which is detected in step S12, and the forward tilt angles θR(t) and θL(t) (operation detection information) of the lower back portion with respect to the right and left thigh portions, which are detected in step S13.

The ECU 66 stores in the RAM the pitch angle θP(t) of the upper body of the wearer 6 in the forward direction with respect to the vertical direction, which is detected in step S12, and a forward tilt angle (angle between the back bone and the thigh bone) θ(t) of the lower back portion with respect to the thigh portion of the wearer 6, which is calculated using the following formula (2), as estimated posture information obtained by estimating the lift-up posture of the wearer 6 in the lift-up work, and proceeds to step S19. Thus, the process in step S18 corresponds to the posture estimation unit 61A illustrated in FIG. 6.

$$\theta(t)=(\theta L(t)+\theta R(t))/2 \qquad (2)$$

Figure 13:
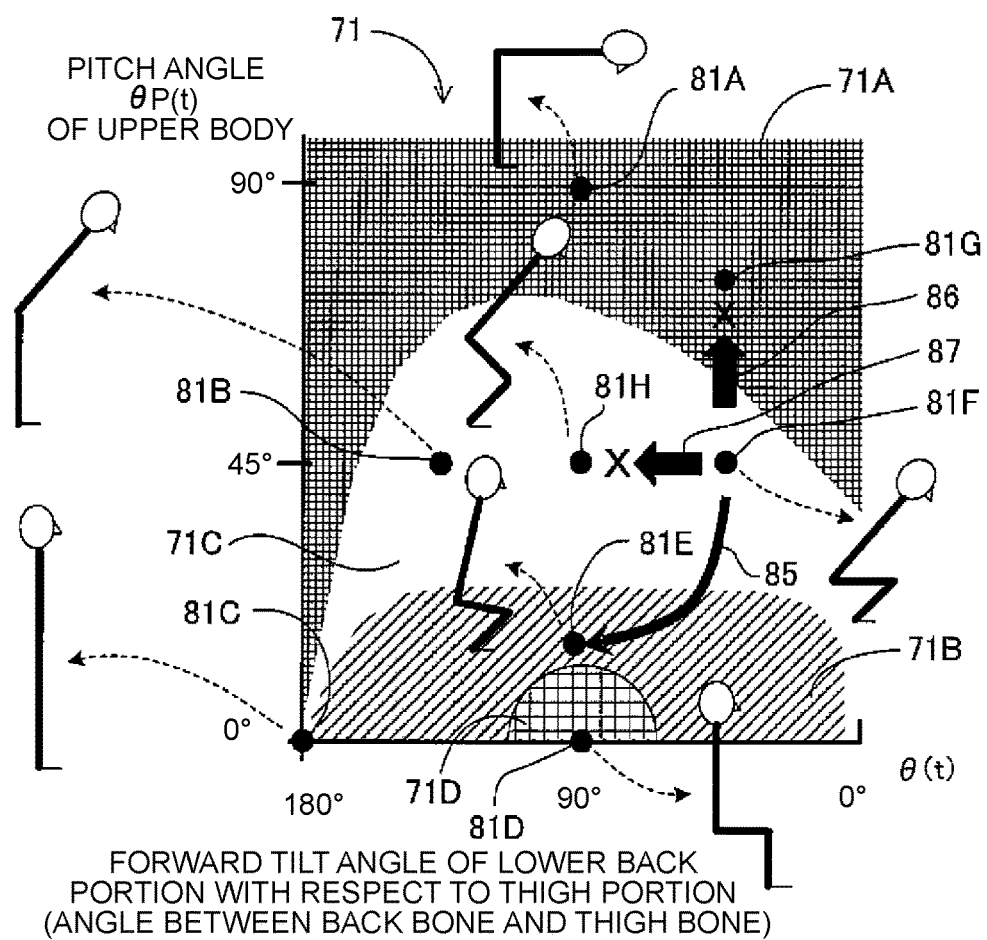
FIG. 13 illustrates an example of posture region information that indicates posture regions to which the postures of the wearer belong in accordance with the pitch angles of an upper body and the forward tilt angles of a lower back portion with respect to thigh portions.

In step S19, the ECU 66 reads from the RAM again the estimated posture information that is stored in step S18, and determines based on posture region information 71 indicated in FIG. 13 whether or not the lift-up posture of the wearer 6 in the lift-up work is a "safe posture" with no excessive force applied to the lower back portion. The posture region information 71 indicated in FIG. 13 is stored in the storage device 67 in advance.

The posture region information 71 will be described with reference to FIG. 13. As indicated in FIG. 13, the posture region information 71 has a vertical axis corresponding to the pitch angle θP(t) of the upper body in the forward direction with respect to the vertical direction, and a horizontal axis corresponding to the forward tilt angle (angle between the back bone and the thigh bone) θ(t) of the lower back portion with respect to the thigh portion that is calculated using the above formula (2). The pitch angle θP(t) that is defined on the vertical axis is set so as to increase at an equal pitch from 0 degrees to 90 degrees. The forward tilt angle (angle between the back bone and the thigh bone) θ(t) of the lower back portion with respect to the thigh portion that is defined on the horizontal axis is set so as to decrease at an equal pitch from 180 degrees to 0 degrees.

The posture region information 71 is divided into an "unreasonable posture region (shaded region) 71A" in which an excessive force is applied to the lower back portion during the lift-up work, a "safe posture region (hatched region) 71B" in which no excessive force is applied to the lower back portion, and an "intermediate region (blank region) 71C" vertically interposed between the unreasonable posture region 71A and the safe posture region 71B. In the safe posture region 71B, a predetermined range (e.g. a semicircular range that projects upward) centered at a position at which the forward tilt angle θ(t) of the lower back portion with respect to the thigh portion is 90 degrees and the pitch angle θP(t) is 0 degrees is set as a "difficult posture region 71D" in which it is difficult to keep the posture.

The unreasonable posture region 71A is set as the entire region above a lower end edge portion that projects upward in a generally semi-arcuate shape and that has a position at which the forward tilt angle θ(t) of the lower back portion with respect to the thigh portion is 180 degrees and the pitch angle θP(t) is 0 degrees and a position at which the forward tilt angle θ(t) is 0 degrees and the pitch angle θP(t) is about 40 degrees defined as left and right lower end points. The vertex of the lower end edge portion of the unreasonable posture region 71A is set at a position at which the forward tilt angle θ(t) of the lower back portion with respect to the thigh portion is about 110 degrees and the pitch angle θP(t) is about 60 degrees.

The safe posture region 71B is set as a region that projects upward in a generally rectangular shape with a line on which the pitch angle θP(t) is 0 degrees and the forward tilt angle θ(t) of the lower back portion with respect to the thigh portion is from 180 to 0 degrees defined as the lower end edge portion, excluding the "difficult posture region 71D" in a semicircular shape. The upper end edge portion of the safe posture region 71B is set at a position at which the pitch angle θP(t) is about 25 degrees and the forward tilt angle θ(t) of the lower back portion with respect to the thigh portion is from about 160 degrees to about 20 degrees.

As indicated in FIG. 13, a lift-up posture of the wearer 6 corresponding to a black dot 81A at which the forward tilt angle θ(t) is about 90 degrees and the pitch angle θP(t) is about 90 degrees, for example, belongs to the unreasonable posture region 71A. That is, the lift-up posture of the wearer 6 corresponding to the black dot 81A indicates a posture in which the wearer 6 lifts up an object with his/her knees straight and with his/her lower back bent forward by about 90 degrees, and in which an excessive force is applied to the lower back portion of the wearer 6 when he/she lifts up a heavy object.

Meanwhile, a lift-up posture of the wearer 6 corresponding to a black dot 81B at which the pitch angle θP(t) of the upper body is about 45 degrees and the forward tilt angle θ(t) is about 135 degrees, for example, belongs to the intermediate region 71C. That is, the lift-up posture of the wearer 6 corresponding to the black dot 81B indicates a posture in which the wearer 6 lifts up an object with his/her knees substantially straight and with his/her lower back bent forward by about 45 degrees, and in which a large force is applied to the lower back portion of the wearer 6 when he/she lifts up a heavy object.

A lift-up posture of the wearer 6 corresponding to a black dot 81C at which the forward tilt angle θ(t) is about 180 degrees and the pitch angle θP(t) is about 0 degrees, for example, belongs to the lower left end portion of the unreasonable posture region 71A. That is, the lift-up posture of the wearer 6 corresponding to the black dot 81C indicates a posture in which the wearer 6 lifts up an object with his/her knees substantially straight and with his/her lower back substantially straight, and in which no excessive force is applied to the lower back portion of the wearer 6, and indicates an end portion of the unreasonable posture region 71A.

A lift-up posture of the wearer 6 corresponding to a black dot 81D at which the forward tilt angle θ(t) is about 90 degrees and the pitch angle θP(t) is about 0 degrees, for example, belongs to the "difficult posture region 71D" in which it is difficult to keep the posture. That is, it is indicated that it is difficult for the wearer 6 to take the lift-up posture corresponding to the black dot 81D.

Thus, as indicated in FIG. 9, in step S19, the ECU 66 reads from the RAM again the estimated posture information that is stored in step S18, and determines whether or not the lift-up posture of the wearer 6, which is specified in accordance with the pitch angle θP(t) of the upper body of the wearer 6 and the forward tilt angle θ(t) of the lower back portion with respect to the thigh portion of the wearer 6, belongs to the "safe posture region 71B", in which no excessive force is applied to the lower back portion, in the posture region information 71 (see FIG. 13). That is, the ECU 66 determines whether or not the lift-up posture of the wearer 6 is a "safe posture" in which no excessive force is applied to the lower back portion of the wearer 6 when he/she lifts up a heavy object.

In the case where it is determined that the lift-up posture of the wearer 6, which is specified in accordance with the pitch angle θP(t) of the upper body of the wearer 6 and the forward tilt angle θ(t) of the lower back portion with respect to the thigh portion of the wearer 6, belongs to the "safe posture region 71B", in which no excessive force is applied to the lower back portion, in the posture region information 71 (see FIG. 13), that is, in the case where it is determined that the lift-up posture of the wearer 6 is a "safe posture" in which no excessive force is applied to the lower back portion of the wearer 6 when he/she lifts up a heavy object (S19: YES), the ECU 66 proceeds to step S20.

For example, as indicated in FIG. 13, a black dot 81E at which the forward tilt angle θ(t) is about 90 degrees and the pitch angle θP(t) is about 15 degrees in the estimated posture information that is stored in step S18 belongs to the "safe posture region 71B" in the posture region information 71. As a result, the ECU 66 determines that the lift-up posture of the wearer 6 is a "safe posture" in which no excessive force is applied to the lower back portion of the wearer 6 when he/she lifts up a heavy object (S19: YES), and proceeds to step S20.

In step S20, the ECU 66 determines whether or not a warning sound etc. indicating that the lift-up posture is, or is likely to be, a posture in which an excessive force is applied to the lower back portion of the wearer 6 when he/she lifts up a heavy object is generated via the speaker 36. In the case where it is determined that a warning sound etc. indicating that the lift-up posture is, or is likely to be, a posture in which an excessive force is applied to the lower back portion of the wearer 6 when he/she lifts up a heavy object is not generated via the speaker 36 (S20: NO), the ECU 66 ends the process.

In the case where it is determined that a warning sound etc. indicating that the lift-up posture is, or is likely to be, a posture in which an excessive force is applied to the lower back portion of the wearer 6 when he/she lifts up a heavy object is generated via the speaker 36 (S20: YES), on the other hand, the ECU 66 proceeds to step S21. In step S21, the ECU 66 cancels the warning by stopping the warning sound etc. from the speaker 36, and thereafter ends the process.

On the other hand, in step S19, in the case where it is determined that the lift-up posture of the wearer 6, which is specified in accordance with the pitch angle θP(t) of the upper body of the wearer 6 and the forward tilt angle θ(t) of the lower back portion with respect to the thigh portion of the wearer 6, does not belong to the "safe posture region 71B", in which no excessive force is applied to the lower back portion, in the posture region information 71 (see FIG. 13), that is, in the case where it is determined that the lift-up posture of the wearer 6 is not a "safe posture" in which no excessive force is applied to the lower back portion of the wearer 6 when he/she lifts up a heavy object (S19: NO), the ECU 66 proceeds to step S22.

In step S22, the ECU 66 determines whether or not initial posture data, which indicate the lift-up posture of the wearer 6 at the start of lift-up work, are stored in the RAM (not illustrated). Specifically, the ECU 66 determines whether or not the pitch angle θP(t) of the upper body of the wearer 6 in the forward direction (X-axis direction) with respect to the vertical direction (Z-axis direction) and the forward tilt angles θR(t) and θL(t) of the lower back portion with respect to the right and left thigh portions, which are stored in the RAM as initial posture data, are initialized.

In the case where it is determined that initial posture data, which indicate the lift-up posture of the wearer 6 at the start of lift-up work, are stored in the RAM (not illustrated), that is, in the case where it is determined that the pitch angle θP(t) of the upper body of the wearer 6 in the forward direction (X-axis direction) with respect to the vertical direction (Z-axis direction) and the forward tilt angles θR(t) and θL(t) of the lower back portion with respect to the right and left thigh portions, which are stored in the RAM as initial posture data, are not initialized (S22: YES), the ECU 66 proceeds to step S24 to be described later.

On the other hand, in the case where it is determined that initial posture data, which indicate the lift-up posture of the wearer 6 at the start of lift-up work, are not stored in the RAM (not illustrated), that is, in the case where it is determined that the pitch angle θP(t) of the upper body of the wearer 6 in the forward direction (X-axis direction) with respect to the vertical direction (Z-axis direction) and the forward tilt angles θR(t) and θL(t) of the lower back portion with respect to the right and left thigh portions, which are stored in the RAM as initial posture data, are initialized (S22: NO), the ECU 66 proceeds to step S23.

In step S23, the ECU 66 reads the pitch angle θP(t) of the upper body of the wearer 6 in the forward direction with respect to the vertical direction, which is detected in step S12, and the forward tilt angles θR(t) and θL(t) (operation detection information) of the lower back portion with respect to the right and left thigh portions, which are detected in step S13, stores such angles in the RAM (not illustrated) as initial posture data, and thereafter proceeds to step S24. In step S24, the ECU 66 executes a sub process of a "posture warning process" to be described later, and thereafter ends the process.

[Posture Warning Process]

Next, the sub process of the "posture warning process" that is executed in step S24 will be described with reference to FIG. 10. As indicated in FIG. 10, in step S31, the ECU 66 reads from the RAM again the estimated posture information that is stored in step S18, and determines whether or not the lift-up posture of the wearer 6, which is specified in accordance with the pitch angle θP(t) of the upper body of the wearer 6 and the forward tilt angle θ(t) of the lower back portion with respect to the thigh portion of the wearer 6, belongs to the "unreasonable posture region 71A", in which an excessive force is applied to the lower back portion, in the posture region information 71 (see FIG. 13). That is, the ECU 66 determines whether or not the lift-up posture of the wearer 6 is an "unreasonable posture" in which an excessive force is applied to the lower back portion of the wearer 6 when he/she lifts up a heavy object. Thus, the processes in step S19 and step S31 correspond to the posture determination unit 61B illustrated in FIG. 6.

In the case where it is determined that the lift-up posture of the wearer 6, which is specified in accordance with the pitch angle θP(t) of the upper body of the wearer 6 and the forward tilt angle θ(t) of the lower back portion with respect to the thigh portion of the wearer 6, belongs to the "unreasonable posture region 71A", in which an excessive force is applied to the lower back portion, in the posture region information 71 (see FIG. 13), that is, in the case where it is determined that the lift-up posture of the wearer 6 is an "unreasonable posture" in which an excessive force is applied to the lower back portion of the wearer 6 when he/she lifts up a heavy object (S31: YES), the ECU 66 proceeds to step S32.

In step S32, the ECU 66 informs the wearer 6 that he/she is in an unreasonable lift-up posture in which an excessive force is applied to the lower back portion of the wearer 6 when he/she lifts up a heavy object by generating via the speaker 36 a first warning sound (e.g. a buzzer sound) indicating that the wearer 6 is highly likely to suffer from lumbago when he/she lifts up a heavy object, thereafter ends the sub process, and returns to the main flowchart.

In the case where it is determined that the lift-up posture of the wearer 6, which is specified in accordance with the pitch angle θP(t) of the upper body of the wearer 6 and the forward tilt angle θ(t) of the lower back portion with respect to the thigh portion of the wearer 6, does not belong to the "unreasonable posture region 71A", in which an excessive force is applied to the lower back portion, in the posture region information 71 (see FIG. 13), that is, in the case where it is determined that the lift-up posture of the wearer 6 belongs to the "intermediate region 71C" in the posture region information 71 (S31: NO), on the other hand, the ECU 66 proceeds to step S33.

In step S33, the ECU 66 reads the initial posture data, and estimates an initial lift-up posture. The ECU 66 reads from the RAM again the estimated posture information that is stored in step S18, estimates a posture change in the lift-up posture of the wearer 6 in the lift-up work based on the posture region information 71 indicated in FIG. 13, and proceeds to step S34.

Specifically, the ECU 66 reads the pitch angle θP(t) of the upper body of the wearer 6 in the forward direction (X-axis direction) with respect to the vertical direction (Z-axis direction) and the forward tilt angles θR(t) and θL(t) of the lower back portion with respect to the right and left thigh portions, which are stored in the RAM as initial posture data. The ECU 66 estimates, as an initial lift-up posture, the pitch angle θP(t) of the upper body of the wearer 6 in the forward direction with respect to the vertical direction in the initial posture data and the forward tilt angle (angle between the back bone and the thigh bone) θ(t) of the lower back portion with respect to the thigh portion of the wearer 6 that is calculated using the above formula (2). The ECU 66 reads the estimated posture information that is stored in step S18, estimates a posture change in the lift-up posture of the wearer 6 based on the posture region information 71 indicated in FIG. 13, and proceeds to step S34.

In step S34, the ECU 66 determines whether or not a change in the lift-up posture of the wearer 6 is a change to transition to an "unreasonable posture" in which an excessive force is applied to the lower back portion of the wearer 6 when he/she lifts up a heavy object. In the case where it is determined that a change in the lift-up posture of the wearer 6 is not a change to transition to an "unreasonable posture" in which an excessive force is applied to the lower back portion of the wearer 6 when he/she lifts up a heavy object, that is, the posture change is a change to transition to a "safe posture" in which no excessive force is applied to the lower back portion of the wearer 6 when he/she lifts up a heavy object (S34: NO), the ECU 66 ends the sub process, and returns to the main flowchart.

Also in the case where there is no change in the lift-up posture of the wearer 6, the ECU 66 determines that there is a change in the lift-up posture of the wearer 6 to transition to a "safe posture" in which no excessive force is applied to the lower back portion of the wearer 6 when he/she lifts up a heavy object. Thus, the process in step S34 corresponds to the transition determination unit 61C illustrated in FIG. 6.

For example, in the case where the forward tilt angle θ(t) is about 45 degrees and the pitch angle θP(t) is about 45 degrees in the initial lift-up posture that is calculated from the initial posture data, the initial lift-up posture corresponds to a black dot 81F that belongs to the intermediate region 71C in the posture region information 71 as indicated in FIG. 13. In the case where the forward tilt angle θ(t) and the pitch angle θP(t) of the lift-up posture of the wearer 6 that is indicated by the estimated posture information stored in step S18 correspond to a posture change on an arrow 85 directed from the black dot 81F toward the black dot 81E that belongs to the "safe posture region 71B" in the posture region information 71 or positioned in the vicinity of the arrow 85 as indicated in FIG. 13, the ECU 66 determines that such posture change is a change to transition to a "safe posture" in which no excessive force is applied to the lower back portion of the wearer 6 when he/she lifts up a heavy object.

In the case where it is determined that a change in the lift-up posture of the wearer 6 is a posture change to transition to an "unreasonable posture" in which an excessive force is applied to the lower back portion of the wearer 6 when he/she lifts up a heavy object, that is, in the case where it is determined that the wearer 6 is highly likely to suffer from lumbago when he/she lifts up a heavy object (S34: YES), the ECU 66 proceeds to step S35. For example, in the case where the forward tilt angle θ(t) is about 45 degrees and the pitch angle θP(t) is about 45 degrees in the initial lift-up posture that is calculated from the initial posture data, the initial lift-up posture corresponds to a black dot 81F that belongs to the intermediate region 71C in the posture region information 71 as indicated in FIG. 13.

In the case where the forward tilt angle θ(t) and the pitch angle θP(t) of the lift-up posture of the wearer 6 that is indicated by the estimated posture information stored in step S18 correspond to a posture change on an arrow 86 directed from the black dot 81F toward a black dot 81G that belongs to an "unreasonable posture region 71A" in the posture region information 71 or positioned in the vicinity of the arrow 86, as indicated in FIG. 13, the ECU 66 determines that such posture change is a posture change to transition to an "unreasonable posture" in which an excessive force is applied to the lower back portion of the wearer 6 when he/she lifts up a heavy object while bending forward. That is, the ECU 66 determines that the posture change of the wearer 6 is highly likely to cause the wearer 6 to suffer from lumbago when he/she lifts up a heavy object, and proceeds to step S35.

In the case where the forward tilt angle θ(t) and the pitch angle θP(t) of the lift-up posture of the wearer 6 that is indicated by the estimated posture information that is stored in step S18 correspond to a posture change on an arrow 87 directed from the black dot 81F toward a black dot 81H that belongs to the "intermediate region 71C" in the posture region information 71 or positioned in the vicinity of the arrow 87, as shown in FIG. 13, the ECU 66 determines that such posture change is a posture change to transition to an "unreasonable posture" in which the wearer 6 lifts up an object by straightening his/her lower back and an excessive force is applied to the lower back portion of the wearer 6 when he/she lifts up a heavy object. That is, the ECU 66 determines that the posture change of the wearer 6 is highly likely to cause the wearer 6 to suffer from lumbago when he/she lifts up a heavy object, and proceeds to step S35.

In step S35, the ECU 66 informs the wearer 6 that he/she is making a posture change to transition to an "unreasonable posture" in which an excessive force is applied to the lower back portion of the wearer 6 when he/she lifts up a heavy object by generating via the speaker 36 a second warning sound (e.g. a beeping sound) indicating that the wearer 6 highly likely suffers from lumbago when he/she lifts up a heavy object. The ECU 66 also determines correction operation to correct the lift-up posture of the wearer 6 such that the wearer 6 can take a "safe posture" in which no excessive force is applied to the lower back portion of the wearer 6 when he/she lifts up a heavy object. The ECU 66 indicates the correction operation through voice guidance via the speaker 36, thereafter ends the sub process, and returns to the main flowchart. Thus, the process in step S35 corresponds to the correction operation determination unit 61D illustrated in FIG. 6.

For example, the ECU 66 determines correction operation to correct the posture change of the wearer 6 to a posture change on the arrow 85 directed from the black dot 81F toward the black dot 81E that belongs to the "safe posture region 71B" in the posture region information 71 or positioned in the vicinity of the arrow 85 as indicated in FIG. 13. Specifically, the ECU 66 determines correction operation to reduce the pitch angle θP(t) of the upper body, that is, correction operation to "bring the wearer's upper body back up and stand up". The ECU 66 indicates the correction operation to the wearer 6 through voice guidance "Bring your upper back up and stand up" via the speaker 36.

As has been described in detail above, in the assist device 1 according to the present embodiment, the ECU 66 detects the pitch angle θP(t) of the upper body of the wearer 6 in the forward direction (X-axis direction) with respect to the vertical direction using the 3-axis acceleration and angular speed sensor 35 that is housed in the backpack portion 37. The ECU 66 also detects the forward tilt angle θR(t) of the lower back portion with respect to the right thigh portion of the wearer 6 and the forward tilt angle θL(t) of the lower back portion with respect to the left thigh portion using the output link turning angle detectors 43RS and 43LS that are disposed in the actuators 4R and 4L, respectively.

The ECU 66 estimates the lift-up posture of the wearer 6 from the pitch angle θP(t) of the upper body of the wearer 6 in the forward direction with respect to the vertical direction and the forward tilt angles θR(t) and θL(t) of the lower back portion with respect to the right and left thigh portions. Consequently, it is possible to estimate the posture of the wearer 6 with a simple configuration, which reduces the weight of the assist device 1.

The ECU 66 determines that the estimated lift-up posture of the wearer 6 is an unreasonable posture in which an excessive force is applied to the lower back portion of the wearer 6 when he/she lifts up a heavy object in the case where the estimated lift-up posture of the wearer 6 belongs to the "unreasonable posture region 71A", in which an excessive force is applied to the lower back portion, in the posture region information 71 indicated in FIG. 13. In the case where the estimated lift-up posture of the wearer 6 is an unreasonable posture in which an excessive force is applied to the lower back portion of the wearer 6 when he/she lifts up a heavy object, the ECU 66 informs the wearer 6, by generating a first warning sound via the speaker 36, that he/she is in an unreasonable lift-up posture in which an excessive force is applied to the lower back portion of the wearer 6 when he/she lifts up a heavy object. Consequently, the wearer 6 can easily recognize that he/she is lifting up a heavy object in an unreasonable posture in which an excessive force is applied to the lower back portion, which can effectively suppress lumbago by avoiding an excessive force to be applied to the lower back portion.

In the case where it is determined that the estimated lift-up posture of the wearer 6 belongs to the "intermediate region 71C" in the posture region information 71 indicated in FIG. 13, the ECU 66 determines whether or not a posture change of the wearer 6 in the lift-up work is a posture change to transition to an "unreasonable posture" in which an excessive force is applied to the lower back portion when he/she lifts up a heavy object. In the case where it is determined that the change in the lift-up posture of the wearer 6 is a posture change to transition to an "unreasonable posture" in which an excessive force is applied to the lower back portion of the wearer 6 when he/she lifts up a heavy object, that is, in the case where it is determined that the wearer 6 is highly likely to suffer from lumbago, the ECU 66 informs the wearer 6, by generating a second warning sound, that he/she is making a posture change to transition to an "unreasonable posture" in which an excessive force is applied to the lower back portion of the wearer 6 when he/she lifts up a heavy object.

The ECU 66 also determines correction operation to correct the lift-up posture of the wearer 6 such that the wearer 6 can take a "safe posture" in which no excessive force is applied to the lower back portion of the wearer 6 when he/she lifts up a heavy object, and indicates the correction operation through voice guidance via the speaker 36. Consequently, the wearer 6 can take a safe posture in which no excessive force is applied to the lower back portion when he/she lifts up a heavy object by performing the correction operation, which can effectively suppress lumbago by avoiding an excessive force to be applied to the lower back portion.

The assist device 1 according to the present embodiment may use machine learning (such as a neural network) during the posture estimation (steps S18, S33, and S34). For example, the current lift-up posture and a future lift-up posture may be estimated from posture information such as the pitch angle $\theta P(t)$ of the upper body of the wearer 6 and the forward tilt angles $\theta L(t)$ and $\theta R(t)$ of the lower back portion with respect to the right and left thigh portions.

Learning operation may be performed by adding a storage area (increasing the storage capacity) for learning to the RAM etc. that is used for storage in step S18, storing a learning model, and operating the operation unit R1 (answer information for the learning is also input from the operation unit R1) The current lift-up posture and a future lift-up posture may be estimated using the learning model that has been learned by reflecting the learned learning model in the RAM etc. that is used for storage in step S18. Alternatively, the current lift-up posture and a future lift-up posture may be estimated using a learning model for a different assist device 1 by storing the learning model for the different assist device 1 by way of the operation unit R1 etc.

Machine learning (such as a neural network) may be used also for determination processes for posture determination (steps S19 and S34) etc., as for lift-up posture estimation. For example, learning operation may be performed by adding a storage area (increasing the storage capacity) for learning to the RAM etc. that is used for storage in step S18, storing a learning model, and operating the operation unit R1 (answer information for the learning is also input from the operation unit R1).

The applicable embodiment is not limited to the embodiment described above, and it is a matter of course that a variety of improvements, modifications, additions, and deletions can be made without departing from the scope and spirit of the present disclosure. In the following description, the same symbols as those of the components etc. of the assist device 1 according to the embodiment described above in FIGS. 1 to 13 denote components that are the same as or equivalent to the components etc. of the assist device 1 according to the embodiment described above.

(A) For example, the 3-axis acceleration and angular speed sensor 35 may be further attached to each of the assist arms 51R and 51L of the output links 50R and 50L in place of the output link turning angle detectors 43RS and 43LS. The 3-axis acceleration and angular speed sensor 35 may be electrically connected to the controller 61. The ECU 66 may detect the forward tilt angles $\theta R(t)$ and $\theta L(t)$ of the lower back portion with respect to the right and left thigh portions based on a detection signal from the 3-axis acceleration and angular speed sensor 35 that is attached to each of the assist arms 51R and 51L. Consequently, the ECU 66 can calculate the forward tilt angle (angle between the back bone and the thigh bone) $\theta(t)$ of the lower back portion with respect to the thigh portion of the wearer 6 using the above formula (2).

(B) In the embodiment, for example, the ECU 66 estimates the lift-up posture of the wearer 6 in the lift-up work, and determines whether or not a change in the lift-up posture of the wearer 6 is a change to transition to an "unreasonable posture" in which an excessive force is applied to the lower back portion of the wearer 6 when he/she lifts up a heavy object. Likewise, the ECU 66 may estimate a lift-down posture of the wearer 6 in lift-down work, and determine whether or not a change in the lift-down posture of the wearer 6 is a posture change to transition to an "unreasonable posture" in which an excessive force is applied to the lower back portion of the wearer 6 when he/she lifts down a heavy object. The ECU 66 may issue a warning in the case where it is determined that a change in the lift-down posture of the wearer 6 is a posture change to transition to an "unreasonable posture" in which an excessive force is applied to the lower back portion of the wearer 6 when he/she lifts down a heavy object.

The ECU 66 may indicate, through voice guidance etc. via the speaker 36, correction operation to correct the lift-down posture of the wearer 6 such that the wearer 6 can take a "safe posture" in which no excessive force is applied to the lower back portion of the wearer 6 when he/she lifts down a heavy object. Consequently, the wearer 6 can take a safe posture in which no excessive force is applied to the lower back portion of the wearer 6 when he/she lifts down a heavy object by performing the correction operation, which can effectively suppress lumbago by avoiding that an excessive force is applied to the lower back portion.

(C) In the case where the pitch angle $\theta P(t)$ of the upper body of the wearer 6 in the forward direction with respect to the vertical direction is not varied in step S35, for example, the ECU 66 may indicate the correction operation through voice guidance via the speaker 36, and not assist the lift-up work of the wearer 6 by not driving the electric motors 47R and 47L. Consequently, the wearer 6 can easily know the need to take a safe posture in which no excessive force is applied to the lower back portion when he/she lifts up a heavy object, which can effectively suppress lumbago by avoiding that an excessive force is applied to the lower back portion.

(D) The 3-axis acceleration and angular speed sensor 35 may be provided not only to the backpack portion 37, but also to arm portions of the wearer 6, for example. Consequently, the pitch angle $\theta P(t)$ of the upper body of the wearer 6 in the forward direction (X-axis direction) with respect to the vertical direction can be detected using the 3-axis acceleration and angular speed sensors 35 that are provided to the backpack portion 37 and the arm portions, which can improve the accuracy in the estimated lift-up posture of the wearer 6.

(E) In the embodiment, for example, the pitch angle θP(t) of the upper body of the wearer 6 in the forward direction (X-axis direction) with respect to the vertical direction is detected using the 3-axis acceleration and angular speed sensor 35. However, the lift-up posture of the wearer 6 may be estimated in more detail by additionally detecting a roll angle of the upper body. Consequently, it is possible to improve the precision of the correction operation that enables taking a safe posture in which no excessive force is applied to the lower back portion.

(F) A plurality of types of posture region information 71 in which the lower end edge of the "unreasonable posture region 71A" is set closer to the "safe posture region 71B" stepwise, for example, may be provided. In the case where the wearer 6 has suffered from lumbago and often suffers from lumbago, a type of posture region information 71 in which the lower end edge of the "unreasonable posture region 71A" is set close to the "safe posture region 71B" may be selected and set by operating the operation unit R1. Consequently, it is possible to appropriately determine whether or not a posture change is a posture change to transition to an "unreasonable posture" in which an excessive force is applied to the lower back portion even if the wearer 6 has suffered from lumbago and often suffers from lumbago, which can effectively suppress lumbago of the wearer 6.

(G) The assist device 1 may be provided with a foot bottom load sensor on both feet of the wearer 6, for example. The foot bottom load sensors may be electrically connected to the controller 61. The ECU 66 may estimate the lift-up posture of the wearer 6 during the lift-up work of a heavy object based on detection signals from the 3-axis acceleration and angular speed sensor 35 that is housed in the backpack portion 37, the output link turning angle detectors 43RS and 43LS, and the foot bottom load sensors. Consequently, it is possible to determine whether or not the wearer 6 is lifting up a heavy object, and to appropriately determine whether or not a posture change is a posture change to transition to an "unreasonable posture" in which an excessive force is applied to the lower back portion of the wearer 6 during the lift-up work of a heavy object, which can effectively suppress lumbago.

What is claimed is:

1. An assist device comprising:
 a body mounting fixture to be mounted to at least a lower back portion of a wearer;
 an actuator mounted to the body mounting fixture and a thigh portion of the wearer, the actuator being configured to generate assist torque for assisting operation of the thigh portion with respect to the lower back portion of the wearer or operation of the lower back portion with respect to the thigh portion of the wearer;
 an operation state detector configured to detect an operation state of the wearer; and
 a controller configured to:
  control drive of the actuator,
  acquire an estimated posture of the wearer estimated based on operation detection information detected by the operation state detector when the actuator generates the assist torque,
  determine which of a safe posture in which an excessive force is not applied to the lower back portion, an unreasonable posture in which the excessive force is applied to the lower back portion, and an intermediate posture between the safe posture and the unreasonable posture the estimated posture is categorized as based upon posture region information, and
  when it is determined that the estimated posture is not the safe posture and is not the unreasonable posture:
   estimate a posture change from an initially estimated posture to the estimated posture, and
   determine whether or not the posture change indicates a transition to the unreasonable posture based on the estimated posture change and the posture region information, wherein
 the posture region information includes a data map,
 a first axis of the data map corresponds to a pitch angle of an upper body in a forward direction with respect to a vertical direction, and
 a second axis of the data map corresponds to a forward tilt angle of the lower back portion with respect to the thigh portion.

2. The assist device according to claim 1, further comprising an informing device configured to inform the wearer, wherein the controller is configured to control the informing device so as to inform the wearer that the estimated posture is the unreasonable posture when it is determined that the estimated posture is categorized as the unreasonable posture and inform the wearer that the estimated posture indicates the transition to the unreasonable posture when it is determined that the posture change indicates the transition to the unreasonable posture.

3. The assist device according to claim 1, further comprising an informing device configured to inform the wearer, wherein:
 the controller is configured to:
  determine a correction operation for correcting the estimated posture such that the wearer is allowed to take the safe posture,
  control the informing device so as to inform the wearer that the wearer transitions to the unreasonable posture when it is determined that the estimated posture transitions to the unreasonable posture, and
  control the informing device so as to indicate the correction operation to the wearer.

4. The assist device according to claim 1, wherein:
 the operation state detector includes a pitch angle detector and a lower back portion angle detector, the pitch angle detector being configured to detect a pitch angle of an upper body of the wearer in a forward direction with respect to a vertical direction, and the lower back portion angle detector being configured to detect a forward tilt angle of the lower back portion with respect to the thigh portion of the wearer; and
 the controller is configured to estimate the estimated posture of the wearer based on the pitch angle and the forward tilt angle.

5. The assist device according to claim 1, wherein the controller is configured to:
 store a learning model that has learned the estimated posture; and
 acquire the estimated posture based on the learning model when the actuator generates the assist torque.

6. The assist device according to claim 1, wherein the controller is configured to:
 store a learning model that has learned a determination as to whether or not the estimated posture is categorized as the unreasonable posture; and determine, based on the learning model, whether or not the estimated posture is categorized as the unreasonable posture.

7. The assist device according to claim 4, wherein the lower back portion angle detector includes a first lower back portion angle detector configured to detect a first forward tilt angle of the lower back portion with respect to a right thigh portion of the wearer and a second forward tilt angle of the lower back portion with respect to a left thigh portion of the wearer.

8. The assistance device according to claim 1, wherein the controller is configured to set the initially estimated posture when it is determined that the estimated posture is not the safe posture.

9. The assistance device according to claim 1, wherein the controller is configured to:
    determine which of the safe posture, the unreasonable posture, the intermediate posture, and a difficult posture different from the intermediate posture the estimated posture is categorized as,
    when it is determined that the estimated posture is the intermediate posture, estimate the posture change from the initially estimated posture to the estimated posture and determine whether or not the posture change indicates the transition to the unreasonable posture based the estimated posture change and the posture region information, and
    when it is determined that the estimated posture is the difficult posture, estimate the posture change from the initially estimated posture to the estimated posture and determine whether or not the posture change indicates the transition to the unreasonable posture based the estimated posture change and the posture region information.

10. The assistance device according to claim 1, wherein the controller is configured to determine which of the safe posture, the unreasonable posture, and the intermediate posture the estimated posture is categorized as by determining where a point corresponding to the estimate posture falls within the data map, and
    the point includes a pitch angle data value and a forward tilt angle data value.

11. The assistance device according to claim 10, wherein the first axis is a vertical axis of a coordinate plane, and the second axis a horizontal axis of the coordinate plane.

12. The assistance device according to claim 11, wherein the pitch angle on the vertical axis of the coordinate plane is set to increase at an equal pitch from 0 degrees to 90 degrees, and
    the forward tilt angle on the horizontal axis of the coordinate plane is set to decrease at an equal pitch from 180 degrees to 0 degrees.

13. The assistance device according to claim 10, wherein the data map is divided into a safe posture region, an unreasonable posture region, and an intermediate posture region between the safe posture region and the unreasonable posture region.

14. The assistance device according to claim 13, wherein the controller is configured to:
    categorize the estimated posture as the safe posture when the point falls within the safe posture region,
    categorize the estimated posture as the unreasonable posture when the point falls within the unreasonable posture region, and
    categorize the estimated posture as the intermediate posture when the point falls within the intermediate posture region.

15. The assistance device according to claim 9, wherein the controller is configured to determine which of the safe posture, the unreasonable posture, the intermediate posture, and the difficult posture the estimated posture is categorized as by determining where a point corresponding to the estimate posture falls within the data map, and
    the point includes a pitch angle data value and a forward tilt angle data value.

16. The assistance device according to claim 15, wherein the first axis is a vertical axis of a coordinate plane, and the second axis is a horizontal axis of the coordinate plane.

17. The assistance device according to claim 16, wherein the pitch angle on the vertical axis of the coordinate plane is set to increase at an equal pitch from 0 degrees to 90 degrees, and
    the forward tilt angle on the horizontal axis of the coordinate plane is set to decrease at an equal pitch from 180 degrees to 0 degrees.

18. The assistance device according to claim 15, wherein the map data is divided into a safe posture region, an unreasonable posture region, an intermediate posture region between the safe posture region and the unreasonable posture region, and a difficult posture region under the safe posture region.

19. The assistance device according to claim 18, wherein the controller is configured to:
    categorize the estimated posture as the safe posture when the point falls within the safe posture region,
    categorize the estimated posture as the unreasonable posture when the point falls within the unreasonable posture region,
    categorize the estimated posture as the intermediate posture when the point falls within the intermediate posture region, and
    categorize the estimated posture as the difficult posture when the point falls within the difficult posture region.

* * * * *